US011310295B1

(12) United States Patent
Demmer et al.

(10) Patent No.: US 11,310,295 B1
(45) Date of Patent: Apr. 19, 2022

(54) INTEGRATED WORKSPACE ON A COMMUNICATION PLATFORM

(71) Applicant: Salesforce Inc., San Francisco, CA (US)

(72) Inventors: Michael Demmer, San Francisco, CA (US); Matthew Wahl, San Francisco, CA (US); Christopher Sullivan, Wellesley, MA (US); Ilan Frank, Los Altos, CA (US); Yian Lo, San Francisco, CA (US)

(73) Assignee: Salesforce Inc., San Francisco, CA (US)

( * ) Notice: Subject to any disclaimer, the term of this patent is extended or adjusted under 35 U.S.C. 154(b) by 0 days.

(21) Appl. No.: 17/459,235

(22) Filed: Aug. 27, 2021

(51) Int. Cl.
*H04L 29/06* (2006.01)
*H04L 65/401* (2022.01)
*H04L 12/18* (2006.01)
*H04L 65/4038* (2022.01)

(52) U.S. Cl.
CPC ...... *H04L 65/4015* (2013.01); *H04L 12/1818* (2013.01); *H04L 12/1822* (2013.01); *H04L 65/4038* (2013.01)

(58) Field of Classification Search
CPC ..... H04L 65/4015; H04L 51/12; H04L 67/22; H04L 47/805; G06Q 10/10
USPC ........................................................ 709/204
See application file for complete search history.

(56) References Cited

U.S. PATENT DOCUMENTS

| | | | |
|---|---|---|---|
| 8,307,201 B2* | 11/2012 | Wakita | H04L 67/02 713/153 |
| 10,346,618 B1* | 7/2019 | Ah Kun | G06F 3/0631 |
| 11,032,213 B1* | 6/2021 | Hussain | H04L 41/00 |
| 11,178,088 B1* | 11/2021 | Weiss | H04L 51/16 |

(Continued)

FOREIGN PATENT DOCUMENTS

WO WO-2009154045 A1 * 12/2009 ........... H04L 65/403

OTHER PUBLICATIONS

Antunes et al., "Awareness Checklist: Reviewing the Quality of Awareness Support in Collaborative Applications", 2010 (Year: 2010).*

(Continued)

*Primary Examiner* — Ondrej C Vostal
(74) *Attorney, Agent, or Firm* — Lee & Hayes, P.C.

(57) ABSTRACT

Generating shared workspaces for enabling communications between users of different organizations and facilitating discovery of users associated with different organizations is described. A first user can generate a shared workspace and associate one or more other organizations therewith. The first user can designate first criteria associated with joining the shared workspace. The communication platform can receive a request from a second user to join the shared workspace. Based on a determination that the second user satisfies the first criteria, the communication platform can enable the second user access to the shared workspace. In some examples, an administrator associated with an organization of the second user can establish second criteria for users of the organization to join the shared workspace. In such examples, the communication platform can enable the second user access to the shared workspace based on a determination that the second user also satisfies the second criteria.

20 Claims, 9 Drawing Sheets

(56) References Cited

U.S. PATENT DOCUMENTS

| | | | | |
|---|---|---|---|---|
| 2002/0089541 | A1* | 7/2002 | Orbanes | G06F 8/34 715/764 |
| 2003/0009522 | A1* | 1/2003 | Rau | H04L 29/06 709/205 |
| 2008/0297535 | A1* | 12/2008 | Reinig | G06F 3/011 345/633 |
| 2013/0218829 | A1* | 8/2013 | Martinez | G06Q 10/10 707/608 |
| 2013/0246901 | A1* | 9/2013 | Massand | G06Q 10/10 715/229 |
| 2015/0039357 | A1* | 2/2015 | Segal | G06Q 10/10 705/5 |
| 2015/0302338 | A1* | 10/2015 | Zaveri | H04L 67/10 705/7.39 |
| 2017/0237789 | A1* | 8/2017 | Harner | G06F 3/017 709/205 |
| 2018/0287982 | A1 | 10/2018 | Draeger et al. | |
| 2020/0274835 | A1* | 8/2020 | McCue | H04L 51/046 |
| 2020/0304454 | A1* | 9/2020 | Yu | H04L 63/08 |
| 2020/0341882 | A1* | 10/2020 | Entrekin | G06F 11/3438 |
| 2021/0037000 | A1* | 2/2021 | Attard | G06N 3/08 |
| 2021/0243150 | A1* | 8/2021 | Vasamsetti | H04L 63/20 |
| 2021/0243234 | A1* | 8/2021 | Grant | H04L 67/306 |
| 2021/0243571 | A1* | 8/2021 | Gibbs | H04L 63/104 |
| 2021/0255744 | A1* | 8/2021 | Sullivan | H04L 65/00 |
| 2021/0360073 | A1* | 11/2021 | Rodgers | H04L 67/306 |

OTHER PUBLICATIONS

Aten et al., "Virtual Worlds Affordances for Organizations", 2020 (Year: 2020).*
Booch et al., "Collaborative Development Environments", 2002 (Year: 2002).*
Bose et al., "A Webtop Presented Enterprise System", GB 2451057 A, 2007 (Year: 2009).*
Computer Hope, "Workspace", 2017 (Year: 2017).*
Fleury et al., "A Generic Model for Embedding Users' Physical Workspaces into Multi-Scale Collaborative Virtual Environments", 2010 (Year: 2010).*
IGI Global, "What is Virtual Space", 2021 (Year: 2021).*
Konstantinidis et al., "Collaborative virtual learning environments: design and evaluation", 2009 (Year: 2009).*
Lee et al., "CoWare: A Web-based Groupware for Effective Collaboration", 2000 (Year: 2000).*
Lintern et al., "A Virtual Information-Action Workspace for Command and Control", 2002 (Year: 2002).*
Lyn et al., "Sino-InSpace: A Digital Simulation Platform for Virtual Space Environments", 2018 (Year: 2018).*
Masloboev, "A Technology for Dynamic Synthesis and Configuration of Multi-Agent Systems of Regional Security Network-Centric Control", 2020 (Year: 2020).*
Maun, "Collaborative learning in virtual space and learning in the physical workplace: The case of in-service public-school teachers in India", 2019 (Year: 2019).*
Sciencedirect, "Virtual Spaces", 2012 (Year: 2012).*
David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims to Cut US All Some Slack", Readwriteweb, LexisNexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (Bits), LexisNexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, at FP10, LexisNexis, https://advance.lexis.com/api/permalink/96268e3f-26ad-48ac-a98f-6c39804ebded/?context=1000516, (dated Mar. 4, 2014) 3 pages.

* cited by examiner

INTEGRATED WORKSPACE ON A COMMUNICATION PLATFORM

TECHNICAL FIELD

Individuals and various institutions, such as businesses, schools, and clubs, increasingly rely on sophisticated communication platforms to facilitate efficient task-related communications. An organization may establish and manage one or more workspaces within the organization, such as to enable groups within the organization to collaborate on related projects. The workspaces can include a plurality of communication channels and direct messaging instances through which members of the organization can communicate and share files and/or other information. However, current communication platform workspaces are often limited to users of a single organization. This limitation can reduce the overall effectiveness of the workspace, and prevent collaboration with essential parties outside the organization. While some workspaces may include shared channels with members from two or more organizations, the access to other communication channels and/or other members of the workspace may be limited based on an organizational affiliation of the user.

Additionally, traditional workspaces are often limited in capacity, and thus are not configured to be a location for mass dissemination of information and/or collaboration on a large project. In order to provide information to different groups of users associated with different organizations, a user may publish a communication multiple times in multiple different communication channels. Publishing the information multiple times can be overly burdensome on the user, resulting in a negative user experience. Publishing information in multiple different channels, to reach diverse groups of individuals, may additionally result in inconsistent information being shared, such as if the user fails to publish the information to a particular channel. Ultimately, these issues may cause a communication platform to become more of a burden for users than an effective tool and may cause multiple technical issues, such as clogging computer memory because of redundant content, congesting network bandwidth, and/or using up server or cloud service compute cycles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
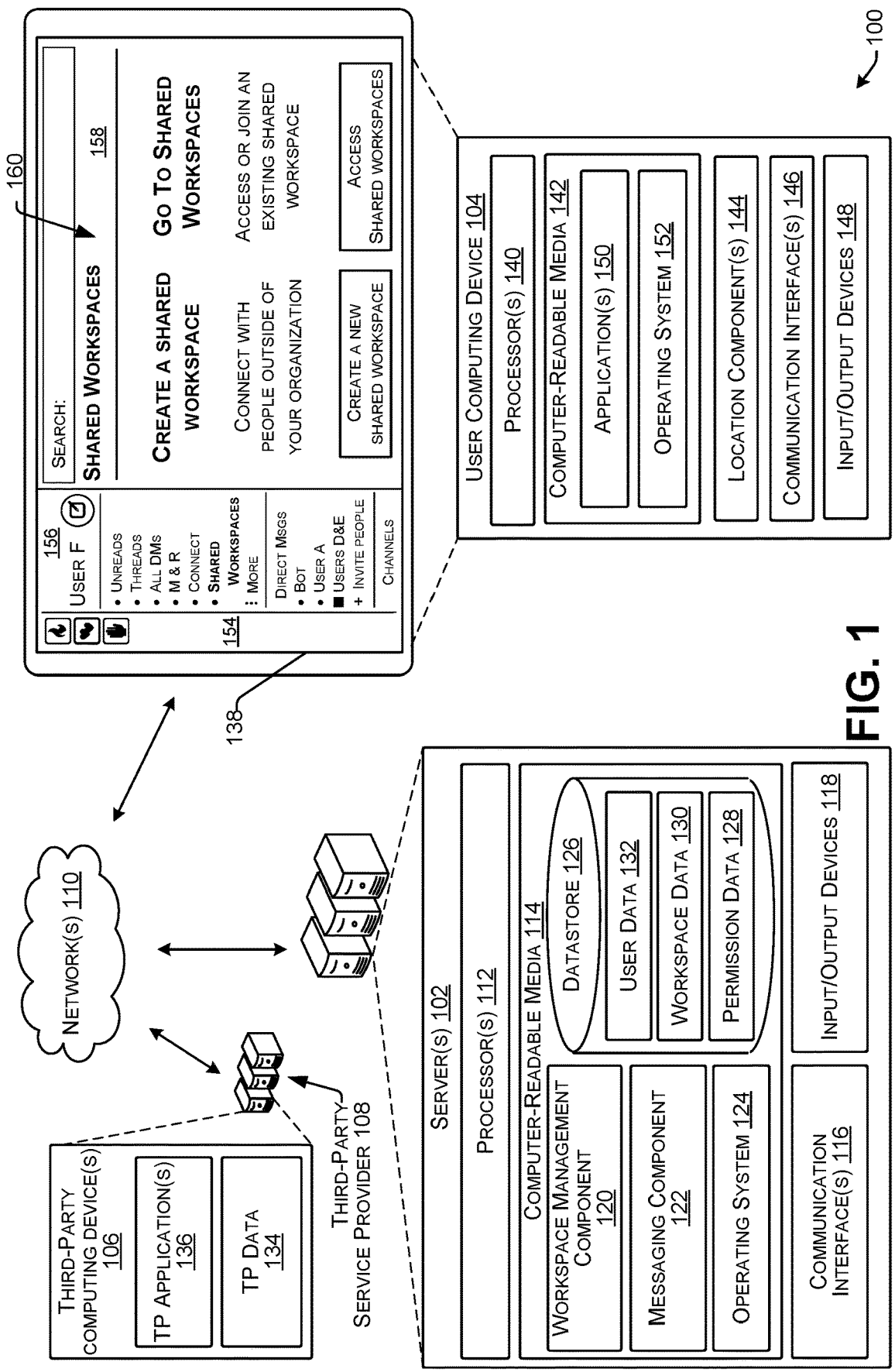
FIG. 1 illustrates a block diagram illustrating an example system of computing devices usable to implement example techniques described herein.

Techniques for generating shared (e.g., integrated) workspaces for members of different organizations to communicate via a communication platform are described herein. The communication platform can be a group-based communication platform, a channel-based messaging platform, and/or any other platform for facilitating communication between and among users. A first user of a first organization can generate a shared workspace to enable collaborations between a first group of users associated with the first organization and a second group of users who are not associated with the first organization. In at least one example, the first user can designate criteria for joining the shared workspace, such as an association with a particular organization (e.g., an employee of the organization, an email with a particular domain name, etc.), an association with an event (e.g., registered for an event, in attendance at an event, etc.), an indication of an interest in a particular topic, or the like. Accordingly, the first user can generate the shared workspace to share information between users who satisfy the criteria. For example, first user can generate the workspace to share information with particular groups of users associated with particular organizations. The first user can establish the criteria to include an association with the particular organizations and/or the particular groups. Another user can request to join the workspace and based on a determination that the other user is associated with a particular organization and/or the particular group established as the criteria, the communication platform can grant the other user access to the workspace.

As discussed above, traditional workspaces are generated to enable information sharing between users of a particular organization. A traditional workspace can have associated therewith a subset of the users of the organization, such as to enable collaboration between the subset of the users. However, traditionally, association with the workspace is predicated on a user association with a particular organization. Though some traditional workspaces enable guests from other organizations to be associated therewith, the guest access is traditionally limited to a particular channel and/or set of channels of the workspace. As such, the guests from the other organizations are not able to view all of the information communicated via the workspace, nor are they able easily discover all of the users associated with the workspace (e.g., the organization).

The techniques described herein enable the generation of a shared workspace between groups of users of different organizations, such that each of the users associated with the shared workspace may access any of the data posted therethrough and may easily discover other users associated therewith. In some examples, the techniques described herein enable a conversion of a non-shared workspace (e.g., single organization workspace) to a shared workspace. In such examples, a generation of a shared channel can include modifying access permissions to an existing non-shared workspace, such as to enable one or more users from other organizations access thereto.

In at least one example, the first user of a first organization can submit a first request to generate (or convert) a shared workspace. The first request can include first criteria associated with joining the shared workspace. The first criteria can include an indication of one or more organizations and/or groups to be associated with the shared workspace, one or more user characteristics (e.g., group or team affiliation (e.g., associated organizational identifier, group identifier, team identifier), project affiliation, job title, job description, personal interest, physical location, event affiliation (e.g., registration, purchased tickets, located at an event location, etc.), a portion of contact information (e.g., domain name associated with email address, area code associated with phone number, etc.), and the like. In various examples, the first user can designate, in the first request, one or more communication channels, or other workspace features (e.g., boards, stories (e.g., video clips, audio clips, media clips, etc.), bookmarks, etc.), to be accessible to members of the shared workspace (e.g., users associated with the shared workspace).

The communication platform can receive the first request from the first user and can generate the shared workspace. In various examples, the first user can send an invitation to one or more users to join the shared workspace. In such examples, the first user can inform other users about the creation of the shared workspace. In some examples, the communication platform can identify one or more users who satisfy the first criteria and can cause an indicator associated with the shared workspace to be presented via an interface of a communication application associated with the communication platform. For example, the communication platform can determine that a second user registered for an event associated with a shared workspace. The communication platform can identify a second user account associated with the second user and can cause the indicator to be presented in association with the second user account. The second user can submit a request to join the shared workspace via the indicator.

In some examples, the communication platform can identify one or more organizations associated with the shared workspace based on the first request. In some examples, the communication platform can send a message to one or more administrators associated with the one or more organizations, to provide an indication of the organizational affiliation with the shared workspace. In some examples, the message can provide an administrator of another organization with an opportunity to accept or decline an organizational affiliation with the shared workspace. Based on a determination that the organizational affiliation is declined by an administrator, the communication platform can remove an association of the other organization from the shared workspace. In some examples, the communication platform can send a notification to the first user that the organizational affiliation has been declined. Based on a determination that the organizational affiliation is accepted by an administrator, the communication platform can associate the other organization with the shared workspace, enabling one or more users of the other organization access to the shared workspace, such as based on the first criteria.

In some examples, the message can enable an administrator of the other organization to establish second criteria associated with users of the other organization joining the shared workspace. The second criteria can include user characteristics such as a group or team affiliation within the other organization, a project affiliation, a job position, a job title, a qualification (e.g., an expertise, degree, certification, etc.), or the like. In various examples, the communication platform can identify one or more users of the other organization that satisfy the second criteria and can cause the indicator associated with the shared workspace to be presented via one or more interfaces associated with the one or more users.

In various examples, the communication platform can receive a request, such as from a second user account of a second user, to join the shared workspace. In at least one example, the request can be submitted via the indicator associated with the shared workspace. In some examples, the request can be submitted based on a location associated with a user device of the second user. For example, the communication platform can receive location data associated with the user device associated with the second user. The communication platform can determine, based on the location data, that the user device is within a threshold distance of a location associated with an event that is associated with a shared workspace. The communication platform may cause the indicator associated with the shared workspace to be presented via an interface associated with the user device, such as via a notification or an update to the interface, or the like. The second user can submit the request to join the shared channel via the indicator presented on the interface.

In various examples, the communication platform can receive the request to join the shared workspace, and can verify that the user and/or the user account associated with the request satisfies the first criteria and/or the second criteria (e.g., criteria established by an administrator of an organization of the user). Based on a determination that the user does not satisfy the first criteria and/or the second criteria, the communication platform can cause an error notification to be presented to the requesting user. Based on a determination that the user satisfies the first criteria and/or the second criteria, the communication platform can associate the shared workspace with the user account, enabling the user access to the shared workspace. In at least one example, the user can access one or more communication channels that are associated with the shared workspace. In some examples, the members of the shared workspace can be discoverable to the user, such as via a directory associated with the shared workspace. In such examples, once associated with the shared workspace, the user can easily identify and/or communicate with other members of the shared workspace.

Techniques described herein can facilitate discovery of and communication with other members of a communication platform. As discussed above, in a traditional communication platform, a guest of a workspace associated with an organization can be granted access to a shared channel (e.g., communication channels shared between two or more organizations) of the workspace. The guest may be able to identify members of the shared channel and share data with those members. However, data associated with other users of the organization may be withheld from view by the guest, such that the guest is unable to discover and/or communicate with the other users absent an additional connection, invitation to communicate, or the like. This limitation may reduce an overall effectiveness of the workspace by limiting information flow outside of a particular shared channel. To solve this problem and improve effectiveness and efficiency in communications associated with the communication platform, the techniques described herein enable a user account that satisfies established criteria access to communication channels and/or other features associated with the workspace and all of the users associated with the workspace. That is, the user account can discover communication channels, users, and/or other objects and features consistent with other users in the workspace. This improvement to the communication platform workspace can facilitate communications and increase an overall effectiveness and efficiency of the communication platform.

Additionally, the techniques described herein can reduce an amount of bandwidth used to discover and communicate with other users of the communication platform. As discussed above, due to the limitations associated with a guest account of a conventional workspace, the guest may not be able to identify a user account of another user associated with the workspace within the communication platform. For example, if the other user is not associated with the particular shared channel to which the guest is granted access, the user account of the other user is not discoverable to the user in the traditional workspace. The user can send messages to other users inquiring about the contact information, using network bandwidth and computing resources to send the messages. Unlike these traditional systems that require a user to inquire about contact information for another user, the techniques described herein can provide a user discoverability of all other users associated with a shared workspace. Accordingly, the techniques described herein facilitate discovery of other users, thereby increasing a total amount of network bandwidth available for other computing devices.

The facilitated discovery of users described herein can additionally cause improvements to one or more computing devices associated with the communication platform. For example, because the user utilizing the improved system described herein is not required to send inquiries to identify a particular user, the communication platform server devices and/or the user device associated with the user may have a reduced number of messages to process. In addition to the inquiries, a user trying to identify another user in the traditional system may perform a search for contact information associated with the other user via another resource, such as a social networking application or the like. Thus, in order to communicate with the other user, the user may be required to search for contact information associated therewith. In some examples, the contact information may be associated with an alternative means of communication (e.g., email, social networking message, etc.), thereby requiring an initial contact to be made between the users via the alternative means of communication. The search and initial contact may utilize additional computing resources and network bandwidth that are not required by the improved techniques described herein. As such, the techniques described herein may further reduce the computing resources and network bandwidth required to discover other users in a communication platform.

These and other aspects are described further below with reference to the accompanying drawings. The drawings are merely example implementations and should not be construed to limit the scope of the claims. For example, while some examples are illustrated in the context of a user interface for a mobile device, the same or similar techniques may be implemented using any computing device and the user interface may be adapted to the size, shape, and configuration of the particular computing device.

FIG. 1 illustrates a block diagram illustrating an example system 100 of computing devices usable to implement example techniques described herein. In at least one example, the example system 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifies, as described above, which can be associated with common access credentials, domains, or the like. In some examples, the communication platform can be a hub, offering a secure and private virtual space to enable users to chat, meet, call, collaborate, or otherwise communicate between or among each other. As described above, each group can be associated with a workspace, enabling users associated with the group to chat, meet, call, collaborate, or otherwise communicate between or among each other in a secure and private virtual space. In some examples, the communication platform is a channel-based messaging platform—in other words, channels of the communication platform may be central component of the manner of communicating and providing content via the communication platform. In some examples, members of a group, and thus workspace, can be associated with a same organization. In some examples, members of a group, and thus workspace, can be associated with different organizations (e.g., entities with different organization identifiers).

FIG. 1 illustrates example system 100 as comprising example computing devices including communication platform server(s) 102 and one or more computing devices 104 (e.g., user computing device(s)) associated with a first user, that interact over a network 110. By way of example and not limitation, the communication platform server(s) 102 may be representative of servers used to implement a communication platform system, the first computing device(s) 104 may be representative of user device(s) associated with a first user. The user computing device(s) 104 may be any suitable type of computing device, e.g., portable, semi-portable, semi-stationary, or stationary. Some examples of the user computing device(s) 104 can include a tablet computing device, a smart phone, a mobile communication device, a laptop, a netbook, a desktop computing device, a terminal computing device, a wearable computing device, an augmented reality device, an Internet of Things (JOT) device, or any other computing device capable of sending communications and performing the functions according to the techniques described herein.

In at least one example, the example system 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifies, as described above, which can be associated with common access credentials, domains, or the like. In some examples, the communication platform can be a hub, offering a secure and private virtual space to enable users to chat, meet, call, collaborate, or otherwise communicate between or among each other. As described above, each group can be associated with a workspace, enabling users associated with the group to chat, meet, call, collaborate, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example system 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 and/or one or more third-party computing devices 106 associated with a third-party service provider 108 (e.g., third-party resource) via one or more network(s) 110. That is, the server(s) 102, the user computing device 104, and the third-party computing device(s) 106 can transmit, receive, and/or store data (e.g., content, information, or the like) using the network(s) 110, as described herein. The user computing device 104 and the third-party computing device(s) 106 can be any suitable type of computing device, e.g., portable, semi-portable, semi-stationary, or stationary. Some examples of the third-party computing device(s) 106 can include a server computing device, such as that described above with regard to the server(s) 102, a desktop computing device, a terminal computing device, or the like.

Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example system 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 110 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 110 are well known and are not discussed herein in detail.

In at least one example, the server(s) 102 can include one or more processors 112, computer-readable media 114, one or more communication interfaces 116, and input/output devices 118. Though not illustrated in FIG. 1, the third-party computing device(s) 106 can additionally include one or more processors, such as processor(s) 112, computer-readable media, such as computer-readable media 114, communication interface(s) 116, such as communication interface(s) 116, input/output devices, such as input/output devices 118.

In at least one example, each processor of the processor(s) 112 can be a single processing unit or multiple processing units and can include single or multiple computing units or multiple processing cores. The processor(s) 112 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 112 can be one or more hardware processors and/or logic circuits of any suitable type specifically programmed or configured to execute the algorithms and processes described herein. The processor(s) 112 can be configured to fetch and execute computer-readable instructions stored in the computer-readable media, which can program the processor(s) to perform the functions described herein.

The computer-readable media 114 can include volatile and nonvolatile memory and/or removable and non-removable media implemented in any type of technology for storage of data, such as computer-readable instructions, data structures, program modules, or other data. Such computer-readable media 114 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 114 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 114 can be used to store any number of functional components that are executable by the processor(s) 112. In many implementations, these functional components comprise instructions or programs that are executable by the processor(s) 112 and that, when executed, specifically configure the processor(s) 112 to perform the actions attributed above to the server(s) 102. Functional components stored in the computer-readable media can optionally include a workspace management component 120, a messaging component 122, an operating system 124, and a datastore 126.

In at least one example, the workspace management component 120 can manage workspaces. That is, in at least one example, the communication platform can be partitioned into different workspaces, which can be associated with different groups of users. As described above, each workspace can be associated with a workspace identifier and one or more user accounts can be mapped to, or otherwise associated with, the workspace identifier. User(s) corresponding to such user account(s) can be "members" of the workspace.

In various examples, the workspace management component 120 can be configured to receive, from a first user account associated with a first user, a request to generate a shared workspace. The request can include first criteria to associate with the shared workspace. In some examples, the first criteria can include one or more organizations and/or groups to be associated with the shared workspace. That is, the first request can include one or more organization identifiers and/or group or team identifiers associated with organization(s) and/or group(s) to be associated with the shared workspace. In some examples, a group or team identifier can include a unique identifier associated with a subset of users of an organization. In such examples, the workspace management component 120 can identify a select group of users within an organization that can be associated with the shared workspace based on the first request.

In some examples, the first criteria can additionally include one or more user characteristics for users to be associated with the shared workspace. The user characteristic(s) can include a team affiliation (e.g., group or team identifier), a project affiliation (e.g., user associated with a particular project, job, etc.), job title, job description, personal interest, physical location, event affiliation (e.g., registration, purchased tickets, located at an event location, etc.), a portion of contact information (e.g., domain name associated with email address, area code associated with phone number, etc.), and the like. That is, the first user can identify characteristic(s) associated with user accounts of other users that may be granted access to the shared workspace.

Additionally, the first user can designate, in the first request, one or more communication channels to be associated with the shared workspace. That is, the first user can identify the communication channel(s) that will be accessible to members of the shared workspace (e.g., users associated with the shared workspace). In some examples, the shared workspace can include the public communication channels that are associated with first user account and/or a first organization of the first user (e.g., channels that are publicly discoverable and available to the first user account and/or other users of the first organization). In some examples, the workspace management component 120 can associate all or a portion of the public communication channels of the first organization with the shared workspace by default. In some examples, the workspace management component 120 can enable the first user to remove one or more of the public communication channels that are associated with the shared workspace by default, such as by selecting a particular channel for removal or dissociation. In such examples, the workspace management component 120 can enable the first user to modify the public communication channels that are associated with the shared workspace.

In some examples, the first user can generate one or more new communication channels and/or features (e.g., boards, stories, etc.) to be associated with the shared workspace. In such examples, the workspace management component 120 can receive a request to generate the communication channel(s) and can associate corresponding identifiers with the shared workspace. For example, the first request can include a request to generate a shared workspace associated with an event with a plurality of sub-events (e.g., meetings, presentations, lectures, etc.). A member of the shared workspace can generate one or more communication channels and/or features associated with one or more of the plurality of sub-events, such as to enable users who are interested in a topic of the sub-event(s) and/or who attend the sub-event to communicate with one another. The sub-event specific channel and/or feature can provide a means by which a presenter or other individual can share information associated with the sub-event. For another example, the first request can include a request to generate a shared workspace associated with a particular topic. A member of the shared workspace can generate one or more communication channels associated with subtopics of the particular topic, such as to enable members of the shared workspace to have conversations associated with the subtopics and/or the particular topic. For yet another example, the first request can include a request to generate a shared workspace associated with a conglomerate (e.g., political, corporate, etc.). A member of the shared workspace can generate one or more channels associated with divisions, groups, etc. of the conglomerate, such as to discuss best practices associated with the division, group, etc.

In various examples, the workspace management component 120 can be configured to receive a request to generate a new channel and/or other feature associated with a shared workspace. In some examples, the first user (e.g., user associated with the shared workspace generation) can establish permissions associated with the shared workspace, such as designating one or more users with permission to generate channels. In some examples, the first user can allow all or a portion of the members of the shared workspace to generate a new communication channel associated with the workspace. In various examples, the permissions associated with generating new channels and/or new features in a shared workspace can be determined by the workspace management component 120, such as in a default setting. In some examples, the permissions can be stored in permissions data 128 and/or workspace data 130 associated with the shared workspace.

In some examples, the first request (to generate the shared workspace) can include one or more first criteria associated with joining the shared workspace. That is, the first request can include criteria associated with another user that must be satisfied for the other user to join the shared channel. In some examples, the first criteria can include an indication of one or more organizations and/or groups to be associated with the shared workspace. In such examples, the first user can specify, in the first request, one or more other organizations and/or groups of individuals to be associated with the shared channel. For example, a first user of a first news organization can request to generate a shared workspace for disseminating news information and stories to other news organizations. The first user can identify one or more other organizations to be associated with the shared workspace, such as to provide for a wide dissemination of the news information across two or more organizations. In some examples, the other organization(s) may include subscribers of the first news organization and/or the communication platform.

In some examples, the first criteria can include a paid subscription associated with the workspace. In such examples, other organizations and/or users associated therewith, may join the workspace based on a determination that the organization maintains a paid subscription to the workspace. Continuing the example from above, the first user of the first news organization can request to generate a shared workspace for disseminating news information and stories to other organizations that maintain a paid subscription to receive the news information and stories. The communication platform can be configured to determine one or more organizations that maintain the paid subscription and can grant permission to member(s) of the organization(s) to access the shared workspace based on a determination that the paid subscription is up to date.

In some examples, the first criteria may include one or more user characteristics associated with users who may join the shared workspace. That is, the first user may specify one or more characteristics of user accounts (e.g., users) that may be granted access to the shared workspace. The characteristic(s) can include a group or team affiliation (e.g., associated organizational identifier, group identifier, team identifier), project affiliation, job title, job description, personal interest, physical location (e.g., current location, residence location, business location, etc.), event affiliation (e.g., registration, purchased tickets, located at an event location, etc.), a portion of contact information (e.g., domain name associated with email address, area code associated with phone number, etc.), and the like.

In various examples, a second user associated with a second organization designated for affiliation with a shared workspace (e.g., another organization identified by the first criteria) can receive an indication of affiliation with the shared workspace. In some examples, the second user may include an administrator or user associated with an administrative account of the second organization. In various examples, the indication of affiliation with the shared workspace can include a means by which the second user can determine whether to allow the second organization to be associated with the shared workspace. That is, the indication may provide a means by which the second user can accept or deny an affiliation of the second organization with the shared workspace. In some examples, the indication may provide a means by which the second user can establish one or more second criteria for users of the second organization to be associated with the shared workspace. The second criteria can include user characteristic(s), such as those indicated above. For example, the second user can determine that members of a particular group or team associated with the second organization can be enabled access to the shared workspace. For another example, the second user can determine that members with a particular job title and/or job description can be enabled access to the shared workspace.

In various examples, the workspace management component 120 can store the first criteria and/or the second criteria associated with a shared workspace in the datastore 126, such as in the workspace data 130. In some examples, the workspace management component 120 can manage workspace membership. That is, the workspace management component 120 can receive requests to associate users with individual shared workspaces and the workspace management component 120 can determine whether a user associated with a request to join a shared workspace satisfies the first criteria and/or the second to join the shared workspace.

In some examples, the workspace management component 120 can identify organizations associated with a shared workspace, such as those designated in the request to generate the shared workspace and/or a subsequent request to associate an organization with the shared workspace after a generation thereof. In various examples, the workspace management component 120 can be configured to identify one or more users accounts of users associated with the communication platform that satisfy the first criteria and/or the second criteria for joining a shared workspace. In some examples, the user account(s) can include those of users who are associated with designated organizations and/or other user accounts that satisfy the first and/or the second criteria. In some examples, the workspace management component 120 can determine whether the user account(s) satisfy the first criteria and/or the second criteria based on characteristic(s) associated therewith stored in the datastore 126, such as in user data 132.

In some examples, the workspace management component 120 can identify the user account(s) that satisfy the first criteria and/or the second criteria based on third-party data 134 received from one or more third-party computing devices 106 associated with a third-party service provider 108. In some examples, the workspace management component 120 can be configured to send a query to the third-party computing device 106 to request the third party data 134. In some examples, the query may be submitted via a third-party application 136. In some examples, the third-party computing device 106 can be configured to provide the third-party data 134 to the server(s) 102 and/or the workspace management component 120, such as in response to the query, based on an instruction received from a user, or the like. In some examples, the workspace management component 120 can receive the third-party data 134 and can determine whether a user account satisfies the first criteria and/or the second criteria. For example, the third-party service provider 108 can include an event registration management service provider configured to receive registration requests for an event. The third-party service provider 108 can determine that a new user has registered for an event that is associated with a shared workspace (e.g., with event registration established as a criterion for joining the shared workspace). The third-party service provider 108 can send the third-party data 134 associated with the new user registration to the workspace management component 120. The workspace management component 120 can receive the third-party data 134 and can identify a user account associated with the new user, such as based on a name, contact information, and/or other data usable to identify the user account. The workspace management component 120 can determine, based on the third-party data 134, that the user account satisfies the criterion of event registration and can associate the user account with the shared workspace. In some examples, the workspace management component 120 can store an indication of the association in the datastore 126, such as in workspace data 130, permission data 128, and/or user data 132.

Based on a determination that a user satisfies the first criteria and/or the second criteria, the workspace management component can associate a user account of the user with the shared workspace. In some examples, the workspace management component can associate a shared workspace identifier with the user account, such as in the user data 132. In some examples, the workspace management component 120 can associate a user identifier with the shared workspace, such as in the workspace data 130 and/or the permissions data 128. workspaces. In some examples, based on a determination that the user account satisfies the first criteria and/or the second criteria, the workspace management component 120 can cause an indicator associated with the shared workspace to be presented on a user interface 138 of the user computing device 104). The indicator can provide an indication of an available shared workspace for the user(s) to join.

In at least one example, the messaging component 122 can process messages between users, such as via one or more communication channels and/or direct messaging instances associated with a shared workspace. That is, in at least one example, the messaging component 122 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. The communication channel, or virtual space, can be a data route used for exchanging data between and among systems and devices associated with the communication platform. In at least one example, the messaging component 122 can establish a communication channel between and among various user computing devices, allowing the user computing devices to communicate and share data between and among each other. In at least one example, the messaging component 122 can manage such communications and/or sharing of data. In some examples, data associated with a communication channel can be presented via a user interface.

Further the messaging component 122 can store messages sent between user computing devices in the datastore 126, such as in workspace data 130. In at least one example, the datastore 126 can be configured to store data that is accessible, downloadable, manageable, and updatable. Additionally, the messaging component 122 can store user data 132 associated with users of the communication platform, such as user preferences regarding shared workspaces, communication channels, direct messaging instances, user data (e.g., user characteristics, organization information, work schedule, working location(s), demographic data, etc.), virtual spaces the user has permissions to access, and the like. In some examples, the datastore 126 can be integrated with the server(s) 102, as shown in FIG. 1. In other examples, the datastore 126 can be located remotely from the server(s) 102 and can be accessible to the server(s) 102 and/or user computing device(s), such as the user computing device 104. Additional or alternative data can be stored in the datastore 126 and/or in one or more other data stores.

In some examples, the datastore 126 can be partitioned into discrete items of data that can be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual users can be associated with a database shard within the datastore 126 that stores data related to a particular user account. For example, communication platform user data 132 associated with a particular user account can be stored in a particular database shard. In various examples, the user data 132 can include one or more characteristic(s) of the user and one or more user preferences and/or organization preference associated with the user and/or an organization associated therewith. In some examples, the user preference(s) and/or organization preference(s) can include security settings, data retention settings, workspace and/or communication channel favorites, a preferred communication channel account (e.g., if a user has two or more user accounts (e.g., work account, personal account, etc.) associated therewith), data associated with a user profile that is viewable to other users, preferences with respect to joining new workspaces, communication channels, etc., notification settings, and the like. In at least one example, the user data 132 associated with the user can include an identity of the user, such that when the user joins a shared workspace, the user data 132 (e.g., identity with user preferences, organizational preferences, data retention settings, securities, export settings, data controls, etc.) is associated with the shared workspace. In some examples, the user data 132 (or a portion thereof) may be viewable by other users of the shared workspace. That is, user data 132 associated with a user who joins a shared channel can be discoverable to other members of the shared workspace.

In at least one example, the workspace data 130 can store data associated with individual workspaces and/or individual communication channels and/or direct messaging instances associated therewith. In at least one example, a workspace identifier may be assigned to a workspace, which indicates the physical address in the workspace data 130 where data related to that workspace is stored. A workspace may be "public," which may allow any user within an organization (e.g., associated with an organization identifier) to join and participate in the data sharing through the workspace, or a workspace may be "private," which may restrict data communications in the workspace to certain users or users having particular roles (e.g., managers, administrators, etc.). As discussed above, a workspace may be "shared," which may allow users associated with different organizations (e.g., entities associated with different organization identifiers) who satisfy criteria associated with the shared workspace to join in participate in data sharing through the workspace.

In at least one example, the messaging component 120 can establish a communication channel between and among various user computing devices associated with a shared workspace, allowing the user computing devices to communicate and share data between and among each other. In some examples, the workspace management component 120 can associate a communication channel with a shared workspace, such s based on a default setting associated with generating the shared workspace (e.g., associate all public channels of an organization of a user with the shared workspace), a request from the user generating the shared workspace to create a new communication channel or associate a particular channel with the shared workspace, a request from another member of the shared workspace (e.g., with permissions to modify the communication channels) to generate a new communication channel or associate an existing channel with the shared workspace, and/or the like. In at least one example, a communication channel identification may be assigned to a communication channel, which indicates the physical address in the workspace data 130 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel.

In at least one example, the operating system 124 can manage the processor(s) 112, computer-readable media 114, and/or hardware, software, etc. of the server(s) 102.

The communication interface(s) 116 can include one or more interfaces and hardware components for enabling communication with various other devices (e.g., the user computing device 104, third-party computing device(s) 106, etc.), such as over the network(s) 110 or directly. In some examples, the communication interface(s) 116 can facilitate communication via Websockets, APIs (e.g., using API calls), HyperText Transfer Protocols (HTTPs), etc.

The server(s) 102 can further be equipped with various input/output devices 118 (e.g., I/O devices). Such I/O devices 118 can include a display, various user interface controls (e.g., buttons, joystick, keyboard, mouse, touch screen, etc.), audio speakers, connection ports and so forth.

In at least one example, the user computing device 104 can include one or more processors 140, computer-readable media 142, one or more location components 144, one or more communication interfaces 146, and input/output devices 148.

In at least one example, each processor of the processor(s) 140 can be a single processing unit or multiple processing units, and can include single or multiple computing units or multiple processing cores. The processor(s) 140 can include any of the types of processors described above with reference to the processor(s) 112 and can be the same as or different than the processor(s) 112.

The computer-readable media 142 can include any of the types of computer-readable media 142 described above with reference to the computer-readable media 114 and can be the same as or different than the computer-readable media 114. Functional components stored in the computer-readable media can optionally include one or more applications 150 and an operating system 152.

The application(s) 150 can include a mobile application, a web application, and/or a desktop application. In some examples, one or more of the application(s) 150 can include an instance of a third-party application 136, which can be provided by the third-party service provider(s) 108. In at least one example, at least one application 150 can be provided by the communication platform or which can be an otherwise dedicated application. In some examples, individual user computing devices associated with the system 100 can have an instance or versioned instance of the application(s) 150, which can be downloaded from an application store, accessible via the Internet, or otherwise executable by the processor(s) 140 to perform operations as described herein. That is, the application(s) 150 can be an access point, enabling the user computing device 104 to interact with the server(s) 102 to access and/or use communication services available via the communication platform. In at least one example, the application(s) 150 can facilitate the exchange of data between and among various other user computing devices, for example via the server(s) 102. In at least one example, the application(s) 150 can present user interfaces (e.g., user interface 138), as described herein. In at least one example, a user can interact with the user interfaces via touch input, keyboard input, mouse input, spoken input, or any other type of input. In some examples, user interfaces, as described herein, and/or other operations can be performed via a web browser or other access mechanism.

A non-limiting example of a user interface 138 is shown in FIG. 1. As illustrated in FIG. 1, the user interface 138 can present data associated with the communication platform, such as via a communication platform application 150. In various examples, the user interface 138 can be configured to present data associated with one or more communication channels, one or more direct messages and one or more workspaces (e.g., a shared workspace). That is, in some examples, the user interface 138 can present messages sent via one or more communication channels and/or via direct message(s) in a single user interface so that the user (e.g., of the user computing device 104) can access and/or interact with data associated with the multiple channels and/or direct messaging instances that he or she is associated with and/or otherwise communicate with other users associated with the multiple channels and/or direct messaging instances. The communication channels and/or direct messaging instances can be internal to an organization of the user or externally shared (e.g., include users from two or more organizations, include a first user from a first organization and second user not associated with an organization).

In some examples, the user interface 138 can include a first region 154, or pane, that includes indicator(s) (e.g., user interface element(s) or object(s)) associated with workspace(s) with which the user (e.g., account of the user) is associated. In the illustrated example, indicators associated shared and non-shared (e.g., single organization) workspaces are combined in the first region 154. In other examples, one or more first indicators associated with one or more shared workspaces may be presented separately from one or more second indicators associated with non-shared workspaces, such as in a bifurcated presentation. In some examples, the user interface 138 can include a second region 156, or pane, that includes indicator(s) (e.g., user interface element(s) or object(s)) representing data with which the user (e.g., account of the user) is associated. Additional details associated with the second region 156 and indicator(s) are described below with reference to FIG. 2.

In at least one example, the user interface 138 can include a third region 158, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 158 can be associated with the same or different workspaces. That is, in some examples, the third region 158 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 158 presents data associated with multiple workspaces, at least some data can be associated with an indication of which workspace the data is associated with.

In the illustrative example, the third region 158 includes a shared workspace interface 160 via which a user of the user computing device 104 can access data associated with shared workspaces. In at least one example, the user can generate a shared workspace via the shared workspace interface 160. In some examples, the user can access existing shared workspaces via the shared workspace interface 160. In such examples, the user can access existing shared workspaces with which the user has previously associated and/or can access one or more existing shared workspaces that are rendered discoverable to the user, such as based on by the workspace management component 120 that a user account of the user satisfies one or more first criteria and/or one or more second criteria associated with the existing workspace(s).

In at least one example, the operating system 152 can manage the processor(s) 140, computer-readable media 142, hardware, software, etc. of the user computing device 104.

The location component(s) 144 can include a GPS, Wi-Fi network identifier, triangulation system, gyroscopes, inertial measurement unit, and/or other component configured to determine a location of a user computing device 104.

The communication interface(s) 146 can include one or more interfaces and hardware components for enabling communication with various other devices (e.g., the user computing device 104), such as over the network(s) 110 or directly. In some examples, the communication interface(s) 146 can facilitate communication via Websockets, APIs (e.g., using API calls), HTTPs, etc.

The user computing device 104 can further be equipped with various input/output devices 148 (e.g., I/O devices). Such I/O devices 148 can include a display, various user interface controls (e.g., buttons, joystick, keyboard, mouse, touch screen, etc.), cameras, audio speakers, microphones, connection ports, biometric recognition devices (e.g., fingerprint reader, eye scanners, facial recognition devices, etc.), and so forth.

While techniques described herein are described as being performed by the application(s) 150, techniques described herein can be performed by any other component, or combination of components, which can be associated with the server(s) 102, the user computing device 104, or a combination thereof.

Figure 2:
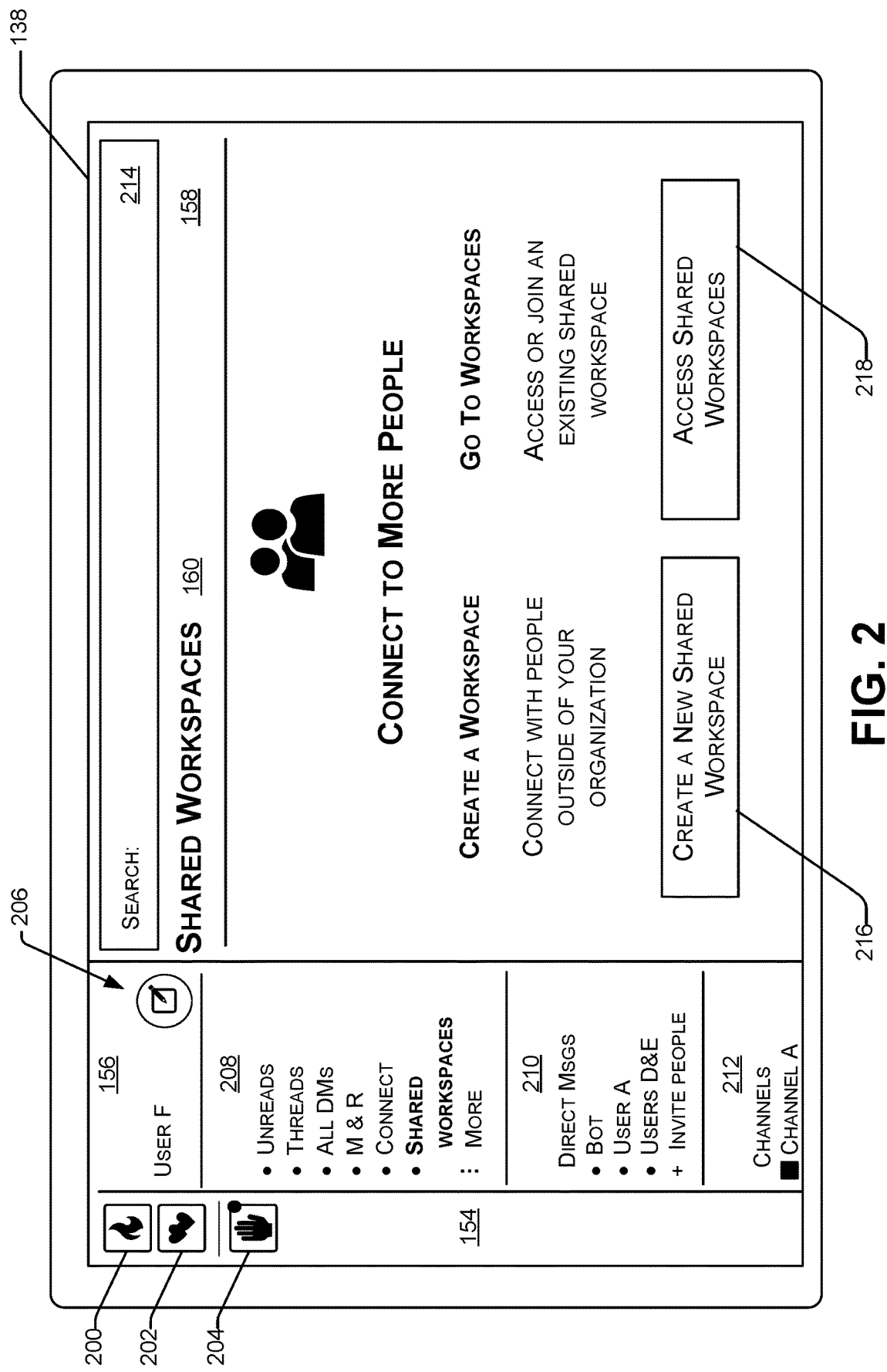
FIG. 2 is a schematic view of an example user interface associated with a communication platform through which a user can generate a shared workspace to enable enhanced collaboration and information dissemination, utilizing the techniques described herein.

FIG. 2 illustrates additional details associated with the user interface 138 that presents data associated with a shared workspaces interface 160, as described above with reference to FIG. 1.

As described above, in at least one example, the user interface 138 can include a first region 154, or pane, that includes indicator(s) (e.g., user interface element(s) or object(s)) of workspace(s) with which the user (e.g., account of the user) is associated. As illustrated in FIG. 2, the user (e.g., User F) can be associated with three different workspaces 200-204. In some examples, the workspaces can be associated with a same organization (e.g., associated with a same organization identifier). In some examples, one or more of the workspaces can be shared workspaces associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-204, presented via the first region 154. In some examples, a user account of the user (e.g., User F) can be associated with group identifiers that correspond to each of the workspaces (e.g., as determined by the user data 132). As such, the user account of the user can be associated with each of the workspaces. A first indicator 200 can represent a first workspace, a second indicator 202 can represent a second workspace, and a third indicator 204 can represent a third workspace. In some examples, at least one workspace can be a shared workspace. In some examples, an indicator associated with the shared workspace can be presented the same or similarly as the other indicators (e.g., those not associated with workflows). In some examples, the indicator associated with the shared channel can be presented differently from the other indicators. For example, as illustrated, the third indicator 204 can be associated with a shared workspace and the communication platform can cause the third indicator 204 to be presented separately from the first indicator 200 and the second indicator 202, such as in a bifurcated presentation of workspace indicators. Though this is merely an illustrative example, and other differentiating presentations of the indicator (e.g., third indicator 204) are contemplated herein, such as a different size, shape, color, animation associated therewith, or the like.

In some examples, the user can navigate between the workspaces by actuating a control associated with each of the indicators 200-204 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, an indicator can be outlined in a heavier weight than other indicators, thereby indicating which workspace the user is currently interacting with and/or most recently interacted with. In some examples, the indicators 200-204 can be associated with another indicator indicating that the corresponding workspace has been updated. An example is shown with respect to the third indicator 204.

While three indicators 200-204 are illustrated in FIG. 2, the user can be associated with any number of workspaces. In some examples, indicators associated with all of the workspaces with which a user is associated can be presented via the first region 154. In some examples, some of the indicators associated with all of the workspaces with which a user is associated can be presented via the first region 154 and the user can interact with the user interface 138 to view additional or alternative indicators. For example, indicators associated with non-shared workspaces can be presented via the first region 154, and indicators associated with shared workspaces can be accessible via a shared workspace interface 160 illustrated in the third region 158.

In some examples, the first region 154 may not be included in the user interface 138, and such information can be integrated into the user interface 138 via additional or alternative mechanisms.

In some examples, the user interface 138 can include a second region 156, or pane, that includes indicator(s) (e.g., user interface element(s) or object(s)) representing virtual space(s) associated with the workspace(s) with which the user (e.g., account of the user) is associated. In the illustrative example, the second region 156 can include a compose selectable option 206 that enables a user (e.g., User F) to compose a message to another user. For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message can include any text, image, video, audio, or combination thereof provided by a user (using a user computing device). For instance, the user can provide a message that includes text, as well as an image and a video, within the message as message contents. In such an example, the text, image, and video would comprise the message. Additionally or alternatively, as discussed above, the communication platform can generate and transmit messages via one or more communication channels responsive to receiving an indication of selection of a code associated with a workflow and/or step of the workflow. Each message sent or posted to a communication channel of the communication platform can include metadata comprising a sending user identifier, a message identifier, message contents, a group identifier, a communication channel identifier, or the like. In at least one example, each of the foregoing identifiers can comprise American Standard Code for Information Interchange (ASCII) text, a pointer, a memory address, or the like.

In at least one example, the second region 156 can include one or more sub-sections, or sub-panes, which can represent different virtual spaces. For example, a first sub-section 208 can include indicators representing virtual spaces that can aggregate data associated with a plurality of communication channels and/or workspaces. In at least one example, each virtual space can be associated with an indicator in the first sub-section 208. In some examples, an indicator can be associated with an actuation mechanism such that when actuated, can cause one of the one or more application(s) 150 (e.g., a communication platform application) to present data associated with the corresponding virtual space via the third region 158. In some examples, a virtual space can be associated with all unread data associated with each of the workspaces with which the user is associated. That is, in some examples, if the user requests to access the virtual space associated with "unreads," all data that has not been read (e.g., viewed) by the user can be presented in the third region 158, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel, "all DMs" can be associated with messages, files, etc. posted in direct messaging instances, and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In at least one example, a virtual space can be associated with expediting communications between a user of an organization and other users associated with other organizations that are different from the organization of the user (illustrated as a select icon) and/or individual accounts, such as those associated with user accounts that do not have an associated organization. For example, section "connect" in sub-section 208 of the second region 156 can be associated with enabling expedited communications with users of other organizations. In some examples, the "connect" virtual space can be associated with one or more channels and/or direct messaging instances that include a user from at least one other organization. In such examples, responsive to receiving a selection of the "connect" indicator in the first sub-section 208, the communication platform can cause a presentation of the one or more channels and/or direct messaging instances in the third region 158.

In at least one example, a virtual space can be associated with shared workspaces. In some examples, the virtual space can include a means by which the user can generate a new shared workspace and/or access an existing shared workspace to which the user is associated. In some examples, the virtual space can additionally provide a means by which the user can request to join an existing shared workspace. For example, "shared workspaces" virtual space can be associated with the shared workspace interface 160 configured to enable a user to create, access, or join shared workspaces. In such examples, responsive to receiving a selection of the "shared workspaces" indicator in the first sub-section 208, the communication platform can cause a presentation of the shared workspace interface 160 in the third region 158.

In at least one example, the second region 156 of the user interface 138 can include a second sub-section 210, or sub-pane, that includes include indicators representative of communications with individual users or multiple specified users (e.g., instead of all, or a subset of, members of an organization). Such communications can be referred to as "direct messages" or "direct messaging instances." That is, the second sub-section 210, or sub-pane, can include indicators representative of virtual spaces that are associated with private messages between one or more users.

In addition to the second sub-section 210, the second region 156 can include a third sub-section 212, or sub-pane, that includes indicators representing communication channels. The communication channels can include public channels, private channels, shared channels, single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user can be associated with both workspaces, or can only be associated with one of the workspaces. In some examples, the communication channels represented can be associated with combinations of communication channels associated with a single workspace and communication channels associated with different workspaces.

In some examples, the third sub-section 212 can depict all the communication channels, or a subset of all the communication channels, that the user has permission to access (e.g., as determined by the permission data 128 and/or user data 132). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the third sub-section 212 can depict all communication channels, or a subset of all communication channels, that the user is a member of, and the user can interact with via the user interface 138 to browse or view other communication channels that the user is not a member of but are not currently displayed in the third sub-section 212.

In some examples, different types of communication channels (e.g., public, private, shared, cross-workspace, etc.) can be in different sections of the third sub-section 212, or can have their own sub-regions or sub-panes in the user interface 138. For example, communication channels associated with a shared workspace can be presented in association with the "shared workspace" indicator in the first sub-section 208 and/or separated from other communication channels in the third sub-section 212. In some examples, communication channels and/or direct messages associated with a shared workspace can be presented in their own region or pane in the user interface 138.

In some examples, the indicators can be associated with graphical elements that visually differentiate types of communication channels. For example, Channel A is associated with a square visual element instead of a circle visual element. As a non-limiting example, and for the purpose of this discussion, the square visual element can indicate that the user is not a current member of Channel A, whereas the circle visual element can indicate that the user is a current member of a channel. In some examples, additional or alternative graphical elements can be used to differentiate between public communication channels, private communication channels, shared communication channels, communication channels associated with different workspaces, workflow communication channels, and the like. In other examples, communication channels that the user is not a current member of may not be displayed in the third sub-section 212 of the user interface 138. In such examples, the user can navigate to a different interface (not shown) to browse additional channels that are accessible to the user but to which the user is not currently a member. Additionally or alternatively, the user can search for additional channels utilizing a search mechanism 214. In some examples, the search mechanism 214 can enable a search for workspaces (e.g., existing shared workspaces, etc.), communication channels, particular messages, data transmitted via and/or stored in association with the communication platform, and the like. In some examples, the search can be performed across each workspace with which the user is associated, or the search can be restricted to a particular workspace, based on a user specification.

As described above, in at least one example, the user interface 138 can include a third region 158, or pane, for presenting data associated with the communication platform, such as data associated with one or more communication channels, direct messaging instances, workspaces, and/or one or more external connections. In at least one example, the third region 158 can present data that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 158 can be associated with a shared workspaces interface 160. That is, in some examples, the third region 158 can present data associated with generating new shared workspaces, accessing an existing shared workspace, joining an existing shared workspace, and/or performing other functions with respect to shared workspaces.

For example, in FIG. 2, the user can interact with the user interface 138 to view data associated with the shared workspace interface 160. In some examples, the shared workspace interface 160 can provide a means by which the user can submit a request to generate (e.g., create) a new shared workspace. In some examples, in response to selecting a workspace creation selectable control 216, the communication platform can cause a presentation of a workspace creation window (not illustrated). In some examples, the user can input one or more first criteria associated with the shared workspace, such as that described above. In some examples, the user can associate a particular event with a shared workspace. In such examples, the workspace creation window can provide a means by which the user inputs details associated with the event, such as a location (e.g., latitude/longitude, address or other physical location, geofence data, registration information (e.g., registration organizer (e.g., first-party, third-party service provider, communication platform), registration time period, etc.). In some examples, one or more of the first criteria associated with joining the shared workspace can be determined based on the details associated with the event.

In various examples, the workspace interface 160 can provide a means by which the user can access or join an existing shared workspace. In some examples, in response to selecting a shared workspace access selectable control 218, the communication platform can cause a presentation of a workspace menu (not illustrated). In some examples the workspace menu can include a first list of shared workspaces with which the user account of the user is associated. That is, the first list of shared workspaces can include one or more shared workspaces with which the user previously requested to join and/or was previously associated. For example, the first list of shared workspaces can include a shared workspace associated with an event that the user previously attended. The shared workspace associated with a previous event can include an active workspace that enables continued communications between attendees of the event or an archived workspace that enables access to the content, but not continued communications. In some examples, direct messaging instances associated with an archived shared workspace can remain active (e.g., continued communications authorized), but communication channels associated with the archived shared workspace may be inactive.

In some examples, the workspace menu can include a second list of shared workspaces that the user is eligible to join. As discussed above, the communication platform can identify one or more existing shared workspaces with criteria (e.g., first criteria and/or second criteria) that the user account satisfies. Based on a determination that the user account associated with the user satisfies the first criteria and/or the second criteria associated with a shared workspace, the communication platform can cause an indicator associated with the shared workspace to be presented in association with the second list of shared workspaces. In some examples, the first list of shared workspaces and the second list of shared workspaces can include a single list of shared workspace. In such examples, the single list of shared workspaces can include indications of whether respective shared workspaces are associated with a user account of the user (e.g., user previously associated with the shared workspace) or are available for the user to join.

As illustrated in FIG. 2, the shared workspace interface 160 includes a means by which the user can generate, access, and/or join a shared workspace. However, this is not intended to be so limiting and the shared workspace interface 160 can include additional or alternative information, such as data associated with one or more communication channels or direct messaging instances associated with a shared workspace. Non-limiting examples of additional data that can be presented via the third region 158 include a feed associated with the one or more communication channels and/or one or more direct messaging instances, user data associated with one or more users of a shared workspace, file(s) (e.g., file attachment(s)) uploaded to a communication channel or direct messaging instance of the shared workspace, application(s) added to from the shared workspace, post(s) (data that can be edited collaboratively, in near real-time by one or members of a shared workspace) added to the shared workspace, workspace data associated with the shared workspace (e.g., organization identifiers of member organizations, group or team identifiers, event data, conglomerate data, etc.), description added to, modified, and/or removed from the shared workspace, modifications of properties of the shared workspace, etc.

In at least one example, data associated with a shared workspace can be viewable to at least some of the users of a group of users associated with a same organization, team, or group identifier. In some examples, for members of a shared workspace, public content of the shared workspace (e.g., messaging communications, files, etc.) can be displayed to each member of the shared workspace. For instance, a common set of group-based messaging communications can be displayed to each member of the shared workspace in association with a communication channel associated therewith, such that the content of the communication channel (e.g., messaging communications) may not vary per member of the shared workspace. In some examples, data associated with a shared workspace can appear differently for different users (e.g., based on personal configurations, group membership, etc.). In at least one example, the format of the individual communication channels or virtual spaces of a shared workspace can appear differently to different users, such as based on organizations associated therewith. For example, a format of an individual communication can appear differently to two different users of two different organizations that are associated with the shared workspace.

The user interface 138 is a non-limiting example of a user interface that can be presented via the user computing device 104 (e.g., by one of the one or more applications 150). In some examples, the application 150 can receive data from the workspace management component 120, the messaging component 122, and/or a third-party computing device(s) 106 (e.g., third-party application 136, third-party data 134, etc.), and can generate and present the user interface 138 based on the data.

In some examples, the application 150 can receive the data and instructions for generating the user interface 138 from the workspace management component 120 and/or messaging component 122. In such an example, the application 150 can present the user interface 138 based on the instructions. Additional or alternative data can be presented via a user interface and additional or alternative configurations can be imagined.

Figure 3A:
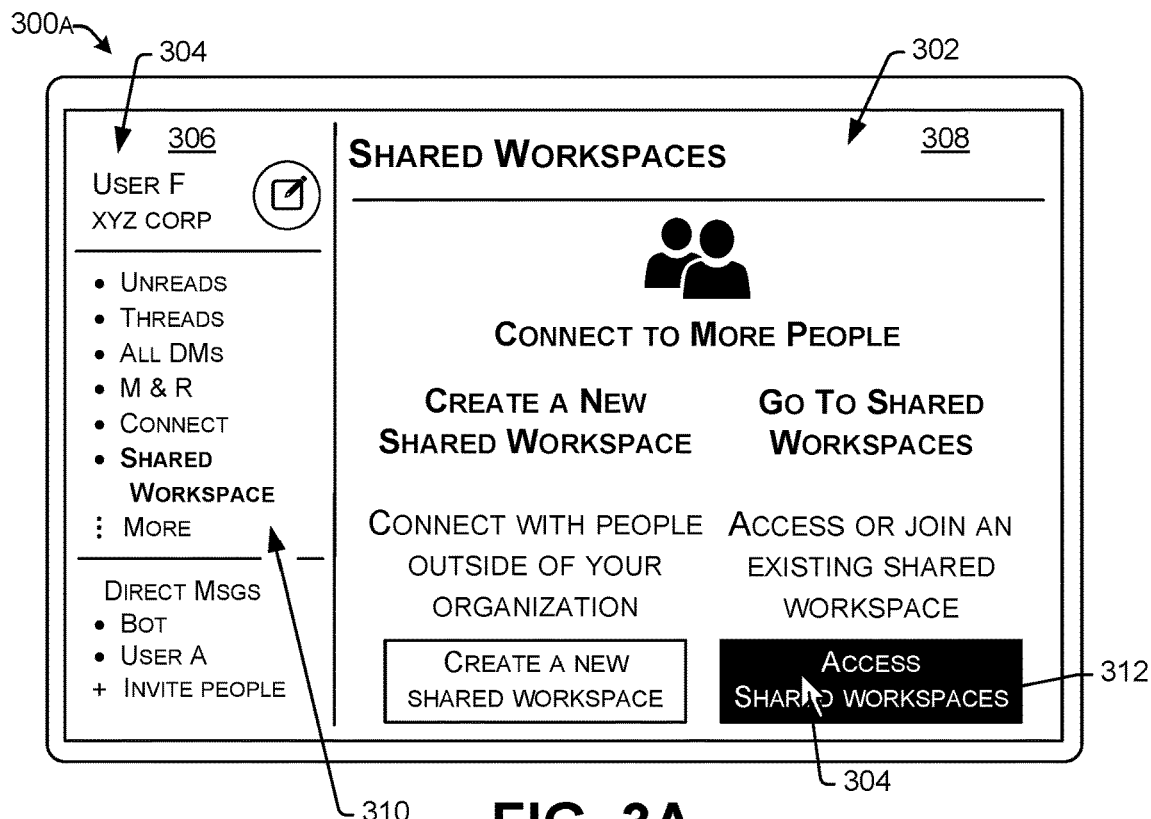
FIGS. 3A and 3B illustrate example user interfaces associated with accessing an existing shared workspace, utilizing techniques described herein.
Figure 3B:
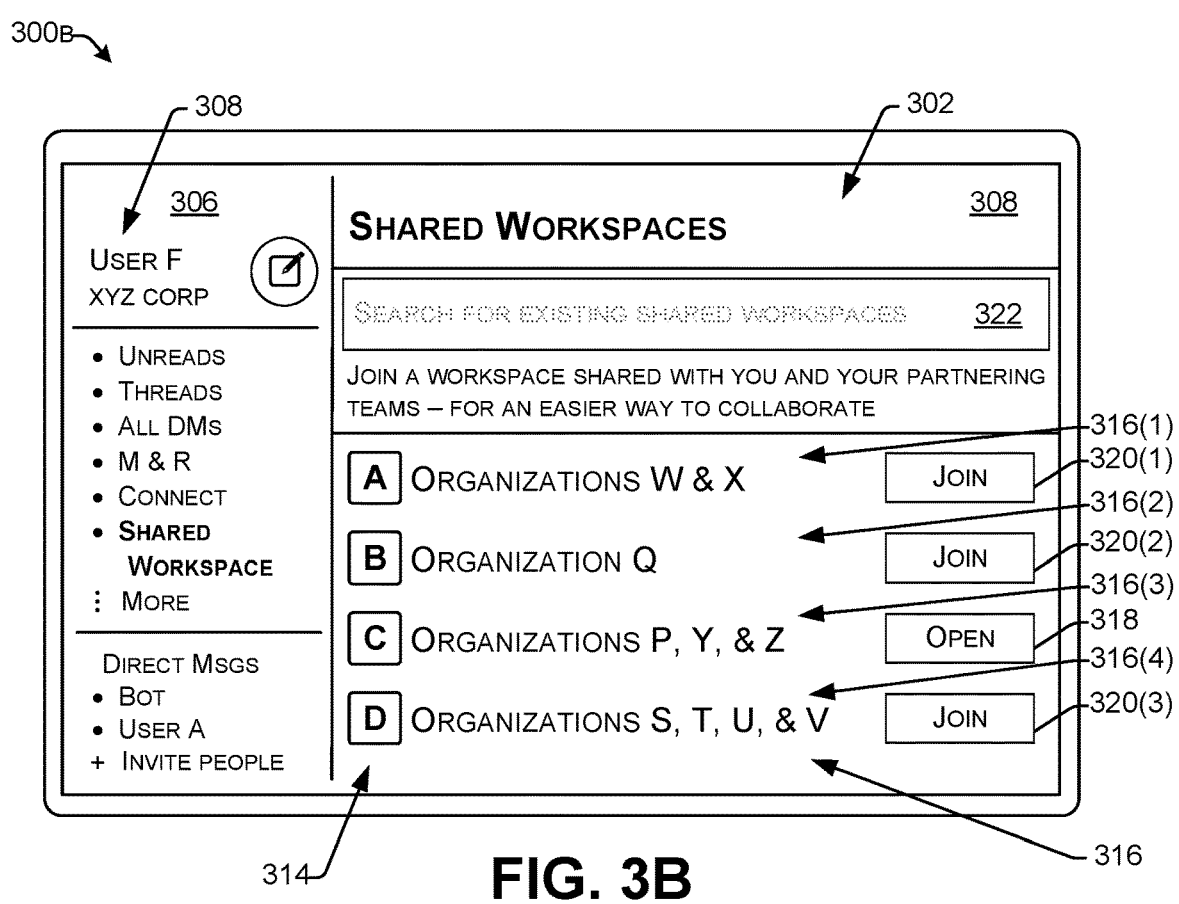

FIGS. 3A and 3B illustrate example user interfaces associated with accessing an existing shared workspace, utilizing techniques described herein. The existing shared workspaces can include one or more shared workspaces previously generated in response to a request from a user of an organization, as described above. Interface 300a of FIG. 3A includes a shared workspace interface 302, such as shared workspace interface 160, configured to enable a user 304 (e.g., User F) to create, access, or join shared workspaces. In the illustrative example, the interface 300a includes a first region 306 and a second region 308, in which the shared workspace interface 302 is presented.

In various examples, the communication platform can cause the shared workspace interface 302 to be presented via in the second region 308 in response to receiving an indication of selection, by the user 304, of a shared workspace indicator 310, such as that illustrated in the first region 306. As discussed above, the shared workspace interface 302 can include a shared workspace access selectable control 312, such as shared workspace access selectable control 218. In various examples, in response to receiving an indication of selection, by the user 304, of the shared workspace access selectable control 312, the communication platform can cause a list of shared channels to be presented via the shared workspace interface 302.

Interface 300b of FIG. 3B includes a list 314 of shared workspaces 316 that are accessible to the user 304 via the communication platform. In the illustrative example, the list 314 includes four (4) shared workspaces 316. However, this is not intended to be so limiting, and the list can include a greater or lesser number of shared workspaces 316. For example, based on a determination that a user account of the user 304 is not associated with any existing shared channels and/or does not satisfy the criteria to join an existing shared channel, the list 314 can include zero (0) shared workspaces 316. In such an example, the shared workspace interface 302 may include a notification indicating that the user 304 is not associated with and/or does not meet the criteria to join an existing workspace. In other examples, in response to determining that the user 304 is not associated with and/or is does not satisfy the criteria associated with a shared workspace, the communication platform may mute (or otherwise disable a selection of) the shared workspace access selectable control 312.

In the illustrative example, the list 314 includes a first workspace 316(1) (e.g., workspace A), a second workspace 316(2) (e.g., workspace B), a third workspace 316(3) (e.g., workspace C), and a fourth workspace 316(4) (e.g., workspace D). As discussed above, the list 314 can include shared workspaces with which the user 304 has previously associated and/or shared workspaces that the user is eligible to join (e.g., user account of the user satisfies criteria associated with the shared workspace). In the illustrative example, the third workspace 316(3) includes a shared workspace with which the user 304 has previously associated (e.g., requested to join, been granted access, etc.). In various examples, the user 304 can access (illustrated as "open") the shared workspace by selecting an open selectable control 318.

As discussed above, the communication platform can be configured to identify one or more existing shared channels that the user is eligible to join. That is, the communication platform can identify criteria (e.g., first criteria, second criteria, etc.) associated with a shared workspace, and determine whether a user account of user 304 satisfies the criteria. In response to a determination that the user account does not satisfy the criteria, the communication platform can withhold an indicator associated with the shared workspace from the list 314 of the shared workspace interface 302. In response to a determination that the user account satisfies the criteria, the communication platform can cause the indicators associated with the shared workspaces 316 to be presented via the list 314. For example, the first workspace 316(1), the second workspace 316(2), and the fourth workspace 316(4) include shared workspaces that the user 304 is eligible to join.

In various examples, the list 314 can include data associated with the shared workspaces 316. In the illustrative example, the data includes a list of one or more organizations that are associated with the respective shared workspaces 316. For example, the first shared workspace 316(1) is associated with organizations W and X, the second shared workspace 316(2) is associated with organization Q, the third shared workspace 316(3) is associated with organizations P, Y, and Z, and the fourth shared workspace 316(4) is associated with organizations S, T, U, and V. Though this is not intended to be so limiting and the data can include an indication of the creator of the shared workspace 316, an event associated with the shared workspace 316, a conglomerate associated with the shared workspace 316, one or more criteria associated with the shared workspace 316, an indication of a characteristic that renders the user 304 eligible to join the shared workspace 316, or the like.

In various examples, the shared workspace interface 302 can include workspace join selectable controls 320 presented in association with shared workspaces 316 that the user is eligible to join. In such examples, the user can submit a request to join the shared workspace 316 associated with the join selectable control 320. For example, the first workspace 316(1) has associated therewith a first join selectable control 320(1), the second workspace 316(2) has associated therewith a second join selectable control 320(2), and the fourth workspace 316(4) has associated therewith a third join selectable control 320(3).

In some examples, in response to receiving an indication of selection of a join selectable control 320 associated with a shared workspace 316 (e.g., receive a request to join the shared workspace 316), the communication platform can send the request to an administrator (e.g., administrative account, originator, etc.) of the shared workspace for authorization. In some examples, in response to receiving the indication of selection of the join selectable control 320 associated with the shared workspace, the communication platform may send a request to an administrator (e.g., administrative account) of an organization of the user 304 to authorize the participation of the user 304 in the shared workspace 316.

In various examples, the shared workspace interface 302 can include a search mechanism 322 that can enable the user 304 to search for one or more shared workspaces associated with the communication platform. In various examples, the communication platform can render all or a portion of the existing shared workspaces 316 discoverable to the user 304. In some examples, the communication platform can render shared workspaces 316 discoverable based on a determination that the user 304 satisfies at least one criterion associated with respective shared workspaces. For example, an organization of the user 304 can be associated with one or more shared workspaces. Based on a determination that the user 304 is associated with the organization, the communication platform can render the shared workspace(s) discoverable via the search mechanism 322. In some examples, the communication platform can render all shared workspaces discoverable via the search mechanism 322, and can mute or otherwise disable a selection of shared workspaces that the user is not eligible to join.

In various examples, in response to receiving a search input (e.g., name of a shared workspace, name of an associated communication channel, identifier associated with an originator of a shared workspace, event associated with a shared workspace, conglomerate or organization(s) associated with a shared workspace, etc.), the communication platform can cause one or more indicators associated with one or more workspaces 316 corresponding to the search input to be presented via the shared workspace interface 302. In some examples, the communication platform can access user data associated with the user 304 to determine whether the user 304 is eligible to join the one or more workspaces 316 identified based on the search input.

Based on a determination that the user 304 is eligible to join a shared workspace 316 of the one or more workspaces, the communication platform may cause a presentation of a join selectable control 320 to be presented in association with the shared workspace 316. That is, the communication platform may enable the user 304 to join the shared workspace 316 identified in a search query. Based on a determination that the user 304 is not eligible to join a shared workspace 316 of the one or more workspaces, the communication platform can cause an indicator associated therewith to be muted or otherwise disabled for selection. In some examples, based on the determination that the user 304 is not eligible to join the shared workspace 316, the communication platform can cause an indication of ineligibility to be presented on the shared workspace interface 302. The indication of ineligibility can include a reason for ineligibility, such as a particular criteria that the user 304 does not satisfy, an indication that an organization associated with the user 304 has not authorized users to join the shared workspace, or the like.

In some examples, the communication platform can render all shared workspaces discoverable via the search mechanism 322, and can mute or otherwise disable a selection of shared workspaces that the user is not eligible to join.

Figure 4A:
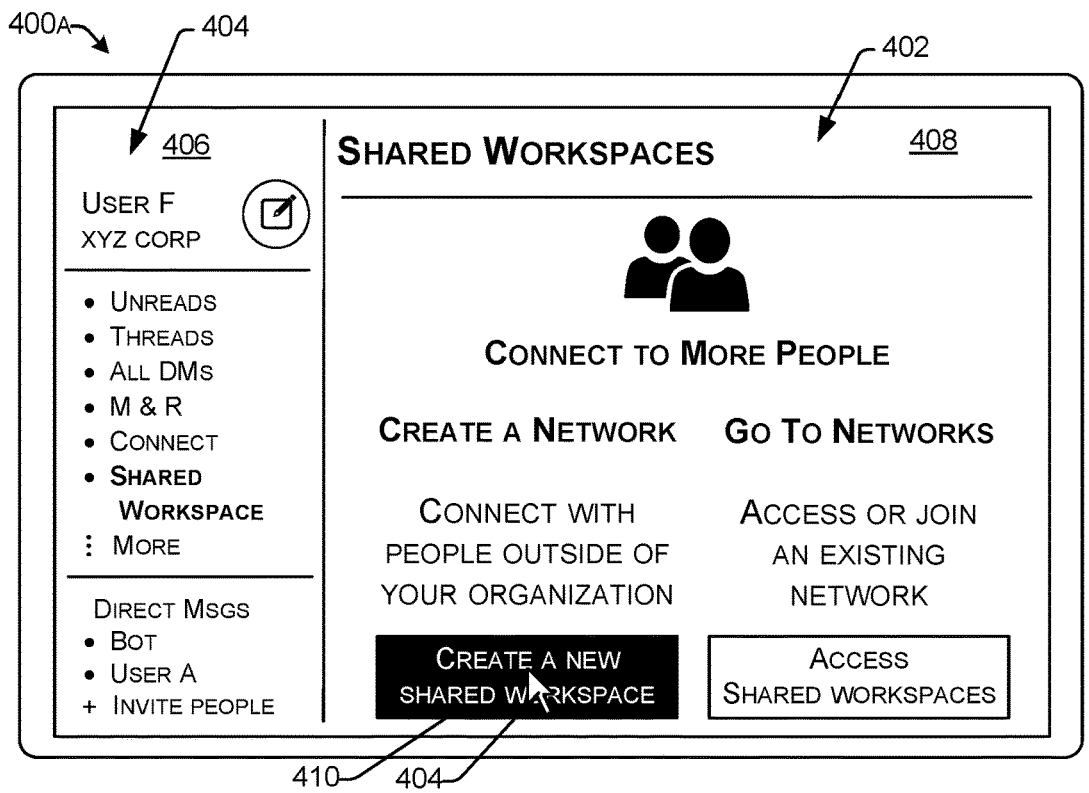
FIGS. 4A and 4B illustrate an example interfaces for generating a new shared workspace, utilizing techniques described herein.
Figure 4B:
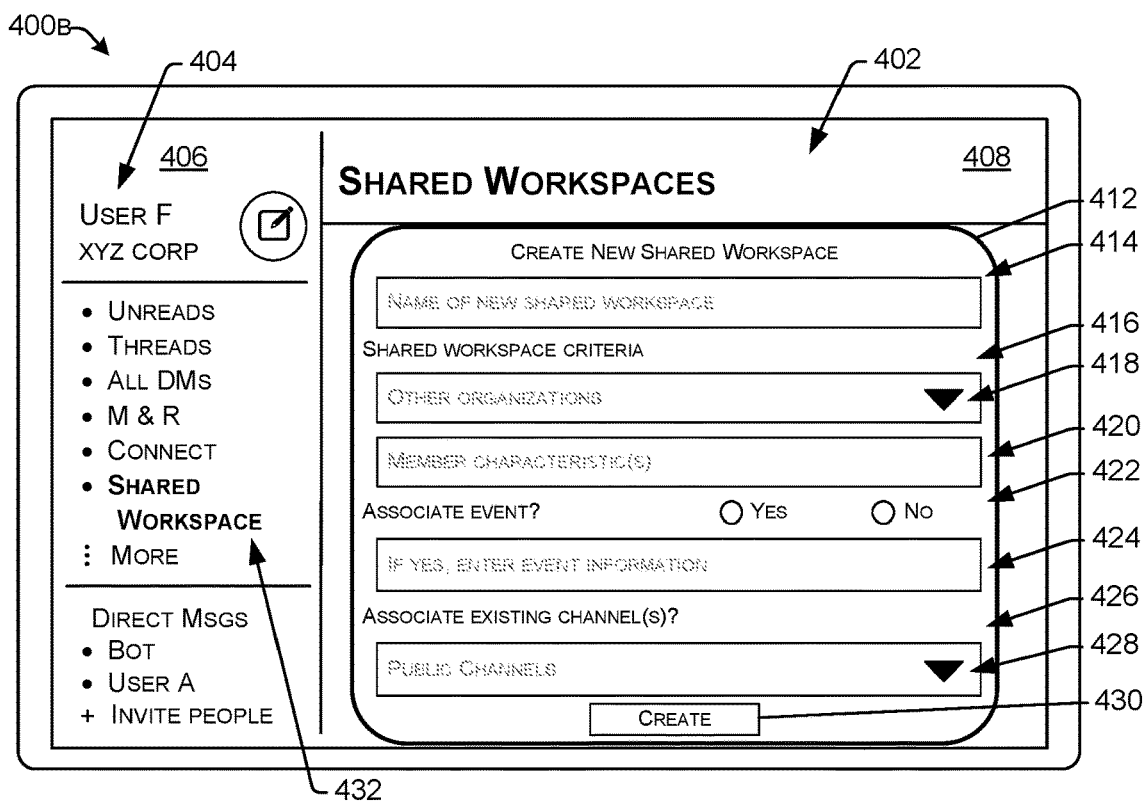

FIGS. 4A and 4B illustrate an example interfaces for generating a new shared workspace, utilizing techniques described herein. Interface 400a of FIG. 4a illustrates a shared workspace interface 402 (e.g., shared workspace interface 160, shared workspace interface 302, etc.) via which a user 404 (e.g., User F) can submit a request to generate (e.g., create) a new shared workspace. In the illustrative example, the interface 400a includes a first region 406 and a second region 408, in which the shared workspace interface 302 is presented. As discussed above, the shared workspace interface 302 can be presented in response to the communication platform receiving an indication of selection of an indicator associated with the shared workspace interface 302, such as the shared workspace indicator 310.

As illustrated, in some examples, the shared workspace interface 402 can include a workspace creation selectable control 410, such as workspace creation selectable control 216. In various examples, in response to receiving an indication of selection, by the user 404, of the shared workspace creation selectable control 410, the communication platform can cause a workspace creation window to be presented via the shared workspace interface 402.

Interface 400b of FIG. 4B includes a workspace creation window 412 presented in association with the shared workspace interface 402. In the illustrative example, the workspace creation window 412 is presented as a window overlaid on the shared workspace interface 402. In other examples, the workspace creation window 412 can be presented as a separate interface comprising all or a part of the second region 408 and/or the first region 406.

The workspace creation window 412 can include one or more interface elements configured to receive user input with respect to one or more characteristics of a new shared workspace to be generated. In some examples, the characteristic(s) can include a name of the new shared workspace, such as that input in a name input box 414. In some examples, the communication platform can be configured to determine a name associated with a shared workspace. In various examples, the communication platform can determine the name based on one or more organizations associated with the shared workspace, an even associated with the shared workspace, a domain name associated with the shared workspace, or the like. For example, a shared workspace can be generated as an extranet associated with an organization (e.g., Org. A) that grants one or more other users outside of the organization access to the shared workspace, such as for collaboration on a project. The communication platform can determine a name of the shared workspace to include the sponsoring organization extranet (e.g., Org A's extranet). For another example, the shared workspace can be associated with a particular event. The communication platform can identify the event associated with the shared workspace, and store the event name as the name of the shared workspace.

In various examples, the characteristic(s) can include shared workspace criteria (e.g., first criteria). The shared workspace criteria can include one or more criteria associated with users joining the new shared workspace. In various examples, the workspace creation window 412 can include an organization input box 416 configured to receive user input associated with one or more organizations to be associated with the new shared workspace. In some examples, the organization input box 416 can be configured to receive one or more names and/or identifiers associated with one or more organizations. In the illustrative example, the organization input box 416 includes a drop down menu selector 418. In such examples, in response to receiving an indication of selection of the drop down menu selector 418, the communication platform may cause a presentation of a list of other organizations that are eligible to be associated with the new shared channel.

In some examples, the one or more organizations can include some or all of organizations that maintain organizational accounts with the communication platform. In some examples, the shared workspace can be open, such that it is not limited to an organizational affiliation. In some examples, the shared workspace can be limited to eligible organization(s). In various examples, another organization (other than the organization of the user (e.g., XYZ Corp.)) can be eligible to be associated with the new shared channel based on a previous connection and/or connection approval between the organization of the user and the other organization. For example, the communication platform can determine that the organization of the user and the other organization are associated with at least one shared channel between a first group of users of the user's organization and a second group of users of the other organization. Based on the shared channel, the communication platform may identify the previous connection between the two organizations.

In some examples, the communication platform identifies the previous connection based on an administrative approval and/or vetting process associated with one or both organizations. In some examples, for a first user of a first organization to establish a connection with at least one other user of a second (different) organization, one or more administrative accounts may be required to authorize the connection. The connection can include a communication channel, a direct messaging instance, an audio or video conference, or the like. In some examples, based on a determination that an administrator (e.g., associated with the administrative account) of the first organization and/or the second organization approve the connection, the communication platform can generate the connection to enable the first user and the at least one other user to communicate therethrough. The communication platform can store an indication of the connection in association with the first organization and the second organization, and can cause the organizations to be presented as an option for selection in the drop down menu associated with the organization input box 416.

In examples in which the shared workspace is associated with an interest group, a community, an event, a conference, and/or large conglomerate that is or could be associated with a plurality of organizations or groups, the user 404 can determine to not include an organization affiliation as a criteria. In such examples, the user 404 can leave the organization input box 416 blank or can designate the shared workspace as open to users of other organizations who satisfy other shared workspace criteria. The other shared workspace criteria can include one or more user (e.g., member) characteristics. The user characteristic(s) can include a team affiliation (e.g., group or team identifier), project affiliation (e.g., user associated with a particular project, job, etc.), job title, job description, personal interest, physical location, event affiliation (e.g., registration, purchased tickets, located at an event location, etc.), a portion of contact information (e.g., domain name associated with email address, area code associated with phone number, etc.), and the like. In various examples, the communication platform can receive input of the user characteristic(s) via a characteristics input box 420 and can store the user characteristic(s) in association with the new shared workspace. In at least one example, the communication platform can access the user characteristic(s) to determine whether a user requesting access to the shared workspace is eligible to join.

In the illustrative example, the workspace creation window 412 can include an event association option 422 which can enable the user 404 to associate an event with the shared workspace. In response to receiving an indication of selection of the "No" option, the communication platform can determine that no event is to be associated with the new shared workspace. In some examples, the communication platform can store in indication of no event association as metadata associated with the new shared workspace. In response to receiving an indication of selection of the "Yes" option, the communication platform can cause a presentation of and/or enable input via an event information box 424.

In various examples, the event information box 424 can provide a means by which the user 404 can input event data associated with the event. The event data can include a name, location (e.g., latitude/longitude, address, building name and/or number, etc.), date(s) and/or time(s), registration information (e.g., third-party service provider configured for managing registration, URL for registration, etc.), and/or the like.

In some examples, the workspace creation window 412 can include a channel input box 426, such as to enable the user 404 to associate one or more existing communication channels with the new shared workspace. In some examples, the user 404 can input, in the channel input box 426, one or more channel names, channel identifiers, topics or classifiers (e.g., type of channel, projects, etc.) associated with channels, team identifiers associated with channels, and the like. Based on the input, the communication platform can identify the associated existing communication channels. For example, the user can input "Project X," "Team Y," and "troubleshooting issue Z" into the channel input box 426. Based on the input, the communication platform can identify one or more existing public communication channels associated with "Project X" one or more existing public communication channels associated with "Team Y" and one or more existing public communication channels associated with a topic of "troubleshooting issue Z," and can associate the identified public communication channel(s) with the new shared workspace.

In various examples, the communication platform can identify one or more public communication channels associated with an organization of the user 404. In various examples, the communication platform can cause the list of public communication channel(s) to be presented via a drop down menu, such as in response to receiving an indication of selection of the drop down control 428. In some examples, the drop down menu can enable the user 404 to select one or more existing public communication channels for association with the new shared workspace. In various examples, the identified public communication channels presented via the drop down menu can include all or a portion of the communication channels associated with the organization, such as a portion of communication channels identified based on the input described above. Continuing the example from above, the drop down menu can include identified public communication channels associated with "Project X," "Team Y," and "troubleshooting issue Z." The communication platform can cause the identified public communication channels to be presented in the drop down menu, such as to enable the user 404 to select or de-select one or more of the identified public communication channels.

In some examples, the communication platform can be configured to automatically select the identified public communication channel(s) for association with the new shared workspace. In such examples, the drop down menu can provide a means by which the user 404 can de-select one or more of the identified public communication channels. In various examples, the automatic selection of channel(s) can be determined based on a user and/or organization preference associated with generating new shared channels, such as that stored in a datastore 126.

In various examples, the shared workspace window 412 can include a creation selectable control 430 configured to enable the user 404 to submit the request to generate the new shared channel based on inputs provided. In various examples, responsive to receiving an input of selection of the creation selectable control 430, the communication platform can generate the new shared channel and can cause an indication thereof to be presented in association with a shared workspace indicator 432, such as shared workspace indicator 310. In at least one example, the new shared workspace can be discoverable to one or more users of the communication platform. In some examples, the new shared workspace can be discoverable to a user based on a determination that the user satisfies criteria associated with the new shared workspace. In some examples, the new shared workspace can be discoverable to a user, such as by utilizing a search mechanism, regardless of satisfaction of the criteria. In such examples, the user may be able to discover (e.g., identify) the new shared channel, but may be prevented from joining the channel until the criteria are satisfied.

In some examples, the communication platform can receive a request to join the new shared workspace and can identify one or more criteria associated with the new shared workspace that are not satisfied by the requesting user. In some examples, the communication platform can cause a notification to be presented to the requesting indicating a failure to join the new shared channel. The notification can provide an indication of the one or more criteria that are not satisfied. For example, a criterion associated with joining a shared channel associated with an event can include registration for the event. The communication platform can receive a request, from a user account of a user, to join the shared channel. The communication platform can identify user data associated with the user and determine that no indication of registration is stored in association with the user account. The communication platform can cause a notification to be presented to the user, the notification indicating that association with the shared is predicated on registration for the event. In some examples, the notification can provide a means by which the user can submit registration confirmation (e.g., confirmation number, attendee number, etc.) and/or a link to register for the event, such as via a third-party service provider or the like. In various examples, in response to receiving an indication that the user has registered for the event (e.g., from the third-party service provider, based on an input from the user, etc.), the communication platform can associate the user with the shared workspace.

FIGS. 5A-8 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 5A:
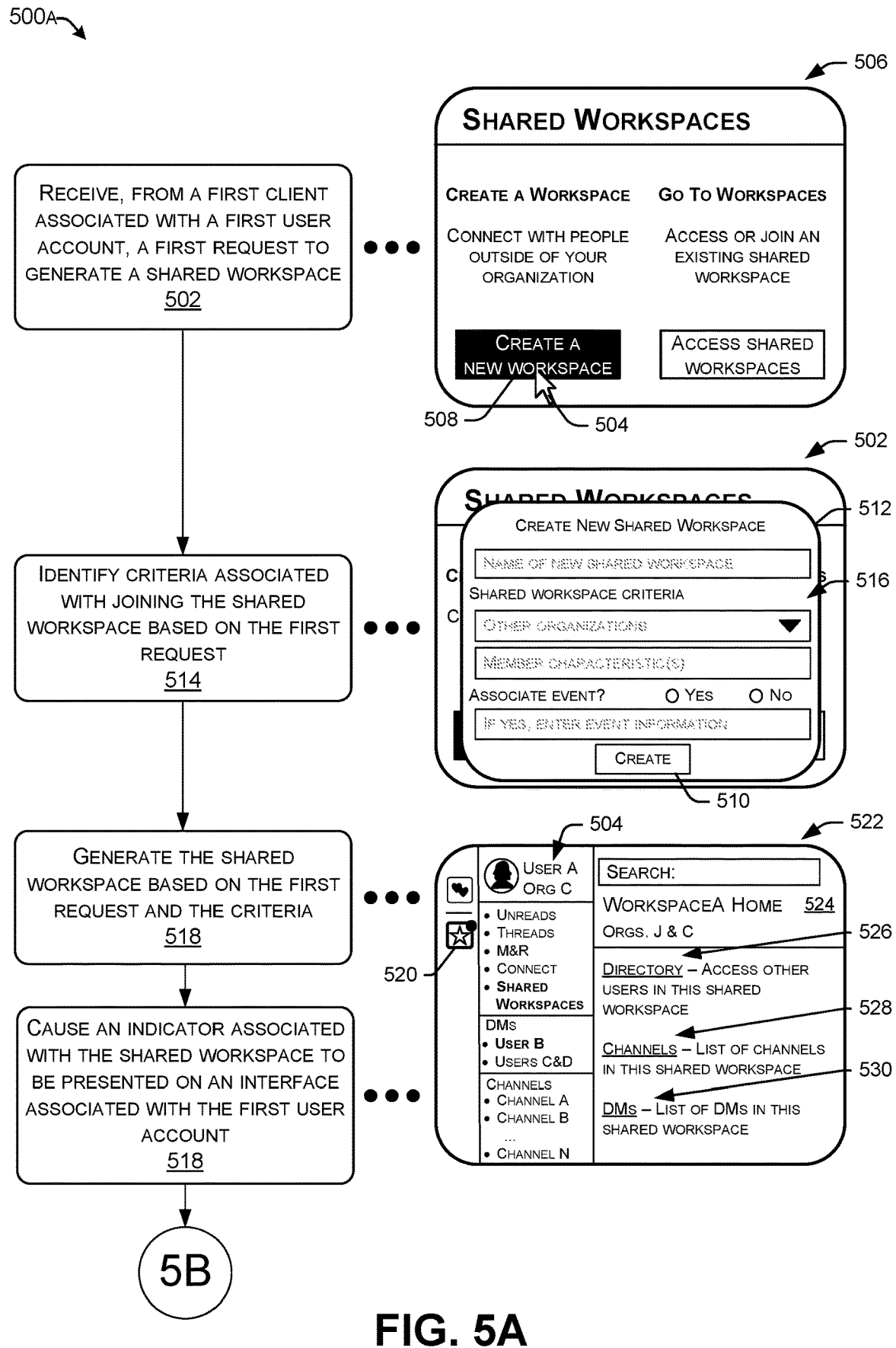
FIG. 5A illustrates an example process for generating a new shared workspace, utilizing the techniques discussed herein.

FIG. 5A depicts a flow diagram of an example process 500a for generating a new shared workspace, utilizing techniques described herein. In some examples, example process 500 may be carried out by communication platform server(s) 102, although in some examples user computing device(s) 104 may provide or receive at least some of the data and instructions discussed and/or may perform one or more of the operations instances where the processing is partially or completely distributed to user computing devices.

At operation 502, the communication platform receives, from a first client associated with a first user account, a first request to generate a shared workspace. The first client can include or be associated with a user computing device, such as user computing device 104, that is associated with a first user 504 (illustrated as a cursor) corresponding to the first user account, such as user 304 and user 404. In various examples, the first request can be received via an instance of a communication application, such as via a shared workspace interface 506, such as shared workspace interfaces 160, 302, and 402. In some examples, the first request can be received in response to an indication of selection, by the first user 504 of a workspace creation selectable control 508, such as workspace creation selectable controls 216 and 410. As discussed above, the first request can be received in response to an indication of selection of a creation selectable control 510, such as creation selectable control 430, associated with a workspace creation window 512.

In various examples, the shared workspace can be associated with an event, a project, a deal, and/or any other collaborative undertaking between first user and at least one other user and/or between a first organization of the first user and at least one other organization of the at least one other user. In some examples, the shared workspace can be associated with two private organizations such that members of a first organization can access communication channels and/or user data associated with the second organization, and vice versa. For example, a first organization can merge operations with a second organization. A first user of the first organization can generate a shared workspace to enable members of the second organization access to public channels and user data associated with members of the first organization. The shared workspace can additionally provide the members of the first organization access to user data associated with members of the first organization. In various examples, an administrative account of the second organization can additionally associate one or more public channels of the second organization with the shared workspace. In such examples, the members of the first organization may be granted access to the public channel(s) of the second organization via the shared workspace.

At operation 514, the communication platform identifies criteria 516 associated with joining the shared workspace based on the first request. In various examples, the criteria 516 can be identified based on default criteria associated with shared workspaces, such as those based on user preference, organization preference (e.g., of an organization of the first user 504), and/or communication platform default criteria. In some examples, the criteria 516 can be identified based on user input, such as via a workspace creation window 512 (e.g., workspace creation window 412).

As discussed above, the criteria 516 can include one or more criteria that must be satisfied for another user to be permitted access to join the new shared channel. In various examples, the criteria 516 can include an organization affiliation (e.g., organization identifier associated with a user account of the other user, etc.), a team affiliation (e.g., group or team identifier), project affiliation (e.g., user associated with a particular project, job, etc.), job title, job description, personal interest, physical location, event affiliation (e.g., registration, purchased tickets, located at an event location, etc.), a portion of contact information (e.g., domain name associated with email address, area code associated with phone number, etc.), and the like. For example, the criteria 516 can include an association with a particular domain name, such that only other users with user accounts that are associated with the domain name are authorized to join the shared workspace.

In various examples, the workspace creation window 512 can include an input box associated with one or more other users to be invited to join or otherwise associated with the new shared workspace. In some examples, in response to receiving an input of another user identifier, name, or the like via the workspace creation window 512, the communication platform can send the other user an invitation to join the new shared workspace. In some examples, the invitation can include a recommendation to join the new shared workspace. In some examples, the communication platform can cause an indicator associated with the new shared workspace to be presented on an interface associated with the other user, such as to enable the other user to access and/or verify an association with the new shared workspace.

At operation 518, the communication platform generates the shared workspace based on the first request and the criteria 516. In various examples, the communication platform stores an instance of the shared workspace in a datastore 126. In various examples, the communication platform associates a user identifier associated with the first user 504 with the shared workspace. In various examples, the communication platform associates one or more communication channels with the shared workspace. As discussed above, the communication channels can include channels that are selected by the communication platform (e.g., automatic selection) and/or channels that are selected by the first user 504 for association with the shared workspace, such as via the workspace creation window 514.

At operation 518, the communication platform causes an indicator 520 associated with the shared workspace to be presented on an interface 522 associated with the first user account. In various examples, the indicator 520 can include a selectable control to enable the first user 504 access to the channel(s) associated with the shared workspace and/or information about the members of the shared workspace. In some examples, the indicator 520 can additionally enable the first user 504 access to one or more direct messaging instances associated with the shared workspace.

In the illustrative example, the interface 522 includes a home page 524 associated with the new shared workspace (e.g., Workspace A). As illustrated the home page 524 can include a directory selectable control 526, a channel selectable control 528, and a direct message selectable control 530 (illustrated DMs). Though this is not intended to be so limiting and the home page 524 can include additional or alternative menus and selectable controls associated with actions available to be performed via the home page 524.

In various examples, the directory selectable control 526 can enable the first user 504 access to contact information associated with each of the members of the shared workspace. In some examples, the contact information can include a name (e.g., real name, username, handle, etc.), email address, physical location (e.g., address, time zone, etc.), telephone number, and/or the like. In some examples, the contact information associated with each member can include a means by which the first user 504 can quickly send a direct message to another member. For example, the first user 504 (e.g., User A) can select the directory selectable control 526 and view a list of one or more members of the shared workspace. The first user 504 can then select an indicator associated with a member of the one or more members to view contact information associated therewith. The first user 504 can then select a selectable control to "send a DM" to the member. In response to receiving an indication of selection of the selectable control, the communication platform can cause a messaging interface to be presented via the first client (e.g., in association with or in lieu of the interface 522).

In various examples, the channel selectable control 528 can enable the first user 504 access to one or more communication channels associated with the shared workspace. As discussed above, the communication channel(s) can include public communication channels associated with an organization of the user, communication channel(s) the first user 504 selects for association with the shared workspace, and/or communication channels that the first user 504 creates for inclusion in the shared workspace. In some examples, in response to receiving an indication of selection of the channel selectable control 528, the communication platform can launch a list of the channels associated with the shared workspace. In some examples, in addition to the list of channels, the communication platform can cause a new channel option to be presented to the first user 504, such as to enable the first user 504 to generate a new communication channel to associate with the shared workspace. In various examples, permissions to generate new communication channels within a workspace may be granted to all or a portion of the members of the shared workspace. In at least one example, the permissions to generate new communication channels may be limited to the creator of the shared workspace, an administrator of the shared workspace and/or organization associated with the creator, and/or an administrator associated with another organization that is associated with the shared workspace.

In various examples, the direct message selectable control 530 can enable the first user 504 access to one or more direct messaging instances associated with the shared workspace. In various examples, the direct messaging instances associated with the shared workspace can include direct messaging instances that are between the first user 504 (e.g., a first member of the shared workspace) and one or more other members associated with the shared workspace.

Though illustrated in a home page 524 in FIG. 5A, the directory selectable control 526, the one or more channels and/or one or more direct messaging instances associated with the shared workspace may be accessible via one or more indicators presented in one or more sub-sections, as described above, such as in the list of "DMs" and/or the list of "channels" presented in association with the interface 522.

Figure 5B:
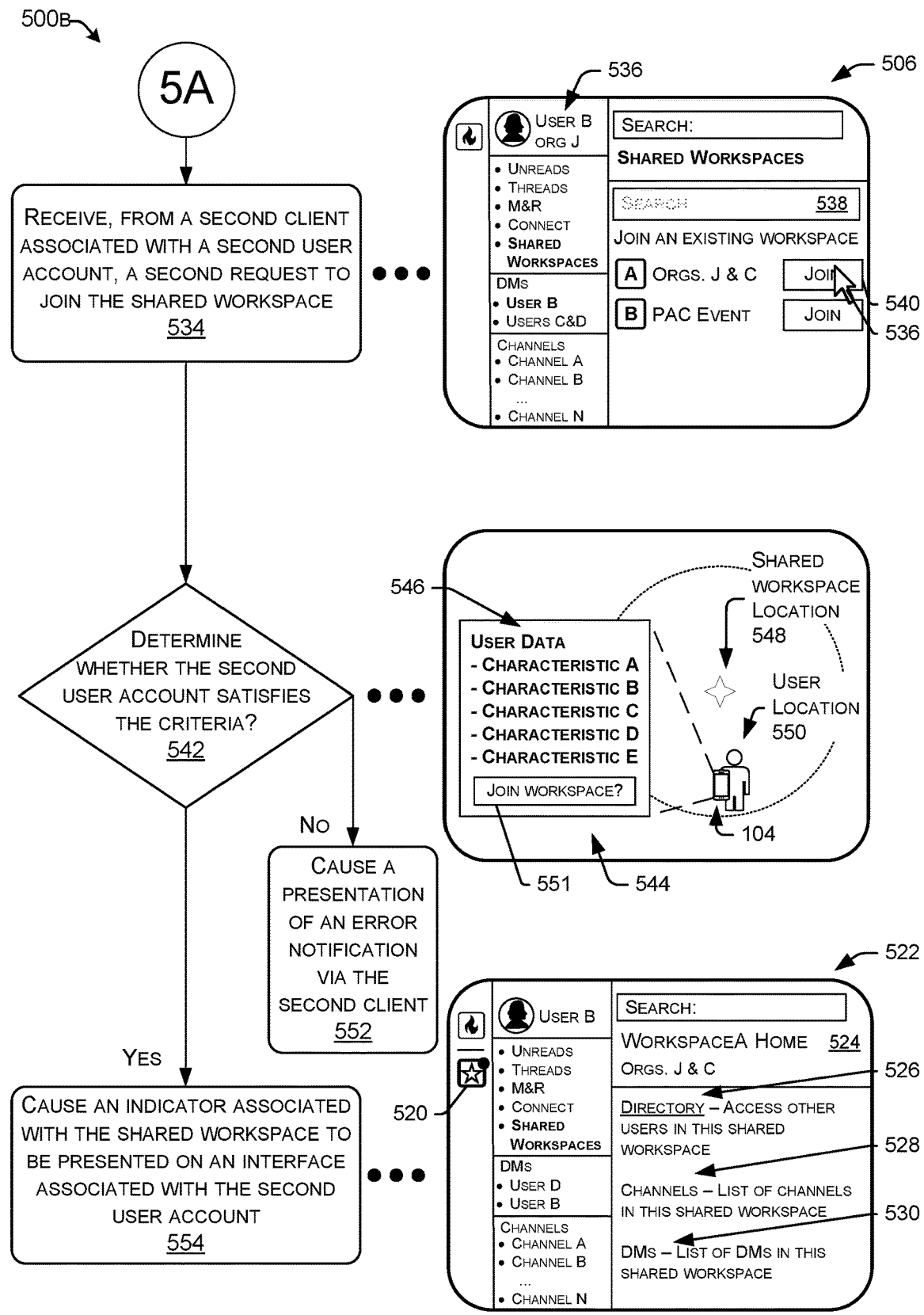
FIG. 5B illustrates an example process for determining whether to grant a user access to a shared workspace, utilizing the techniques described herein.

FIG. 5B depicts a flow diagram of an example process 500b for determining whether to grant a user access to a shared workspace, utilizing techniques discussed herein. In various examples, example process 500b may be carried out by communication platform server(s) 102, although in some examples user computing device(s) 104 may provide or receive at least some of the data and instructions discussed and/or may perform one or more of the operations instances where the processing is partially or completely distributed to user computing devices.

At operation 534, the communication platform receives, from a second client associated with a second user account, a second request to join the shared workspace. The second user account can be associated with a second user 536 (e.g., User B) of the communication platform. In some examples, the second user 536 can be associated with a same organization or a different organization as the first user 504.

In the illustrative example, the second request is received via an instance of a shared workspace interface 506 associated with the second client. In some examples, the second user 536 can search for a particular shared workspace, such as utilizing a search mechanism 538, such as search mechanism 322. In some examples, the communication platform can be configured to identify one or more shared workspaces that are available for the second user to join. In some examples, the shared workspace(s) can be identified based on a determination that the second user account satisfies at least one criterion associated with the shared workspace. For example, a shared workspace illustrated in the shared workspace interface 506 can include a shared workspace associated with an organization (e.g., Org. J) of the second user. For another example, a shared workspace illustrated in the shared workspace interface 506 (e.g., PAC Event) can be presented based on a determination that the second client is within a threshold distance of an event associated with the shared workspace.

In various examples, the communication platform can receive the second request in response to a selection of a join selectable control 540, such as join selectable controls 320. That is, the request can include an indication of selection of the join selectable control 540 associated with a shared workspace.

At operation 542, the communication platform determines whether the second user account satisfies the criteria to join the shared workspace. In various examples, the communication platform can identify one or more characteristics 544 associated with the second user account (e.g., with the second user 536) to determine whether the second user account satisfies the criteria. The characteristics can be stored in association with user data 546 corresponding to the second user account, such as user data 132. In some examples, the characteristics can be stored in association with a user computing device 104 associated with the second client and/or by the communication platform, such as in datastore 126.

As discussed above, the criteria can include an organizational affiliation of the second user, a group or team affiliation within the organization, a project affiliation, job position, job title, qualification (e.g., an expertise, degree, certification, etc.), job description, personal interest, physical location, event affiliation (e.g., registration, purchased tickets, located at an event location, etc.), a portion of contact information (e.g., domain name associated with email address, area code associated with phone number, etc.), and the like. In various examples, the communication platform can compare the user data 546 and/or characteristics 544 associated with the second user account to the criteria to determine whether the second user account is eligible to join the shared workspace.

Additionally or in the alternative, the communication platform can determine whether the second user account is eligible to join the shared workspace based on a location 548 associated with the shared workspace and a user location 550 associated with the second user 536 (e.g., location associated with the second client and/or the user computing device 104 of the second user 536). For example, the location 548 can be a location associated with an event and/or with joining the shared workspace, such as that determined by the criteria (e.g., within a threshold distance of an event location, in a particular city, within a threshold distance of an address, city, town, county, parish, state, etc.). In some examples, the communication platform can identify the location 548 associated with the event and/or a threshold distance therefrom based on criteria input by a creator of and/or administrator associated with the workspace.

In some examples, the communication platform can identify the user location 550 based on location data provided by one or more location components associated with the second client and/or the user computing device 104, such as location components 144. In some examples, the communication platform can identify the user location 550 based on an input received from the second client, such as a check-in at a location, or other indication that the second user 536 and/or the second client is at the location. In some examples, the communication platform can identify the user location 550 based on the user data 546, such as a location (e.g., physical address) that is associated with the second user account.

In at least one example, the communication platform can identify that the second user account satisfies the criteria associated with the workspace and can cause a presentation of a recommendation 551 to join the workspace to be presented via the second client. In various examples, the recommendation 551 can be presented based on an intelligent determination, by the communication platform, that the workspace may be of interest to the second user 536. In some examples, the determination can be made based on a personal interest of the second user 536, a determination that one or more friends, co-workers, or frequent contacts of the second user 536 are associated with the workspace, and/or based on other user data associated with the second user 536. In some examples, the recommendation 551 can include a selectable control to initiate an association with the workspace, such as without having previously received the second request and/or to verify that the second user intends to join the workspace.

Based on a determination that the second user account does not satisfy the criteria ("No" at operation 542), the communication platform, at operation 552, causes a presentation of an error notification via the second client. The error notification can include an indication of one or more criteria that are not met by the second user account.

Based on a determination that the second user account satisfies the criteria ("Yes" at operation 542), the communication platform, at operation 554, causes the indicator 520 associated with the shared workspace to be presented on an instance of the interface 522 associated with the second client. As discussed above, the instance of the interface 522 includes a home page 524 associated with the new shared workspace (e.g., Workspace A). As illustrated the home page 524 can include a directory selectable control 526, a channel selectable control 528, and a direct message selectable control 530 (illustrated DMs). Though this is not intended to be so limiting and the home page 524 can include additional or alternative menus and selectable controls associated with actions available to be performed via the home page 524.

Figure 6:
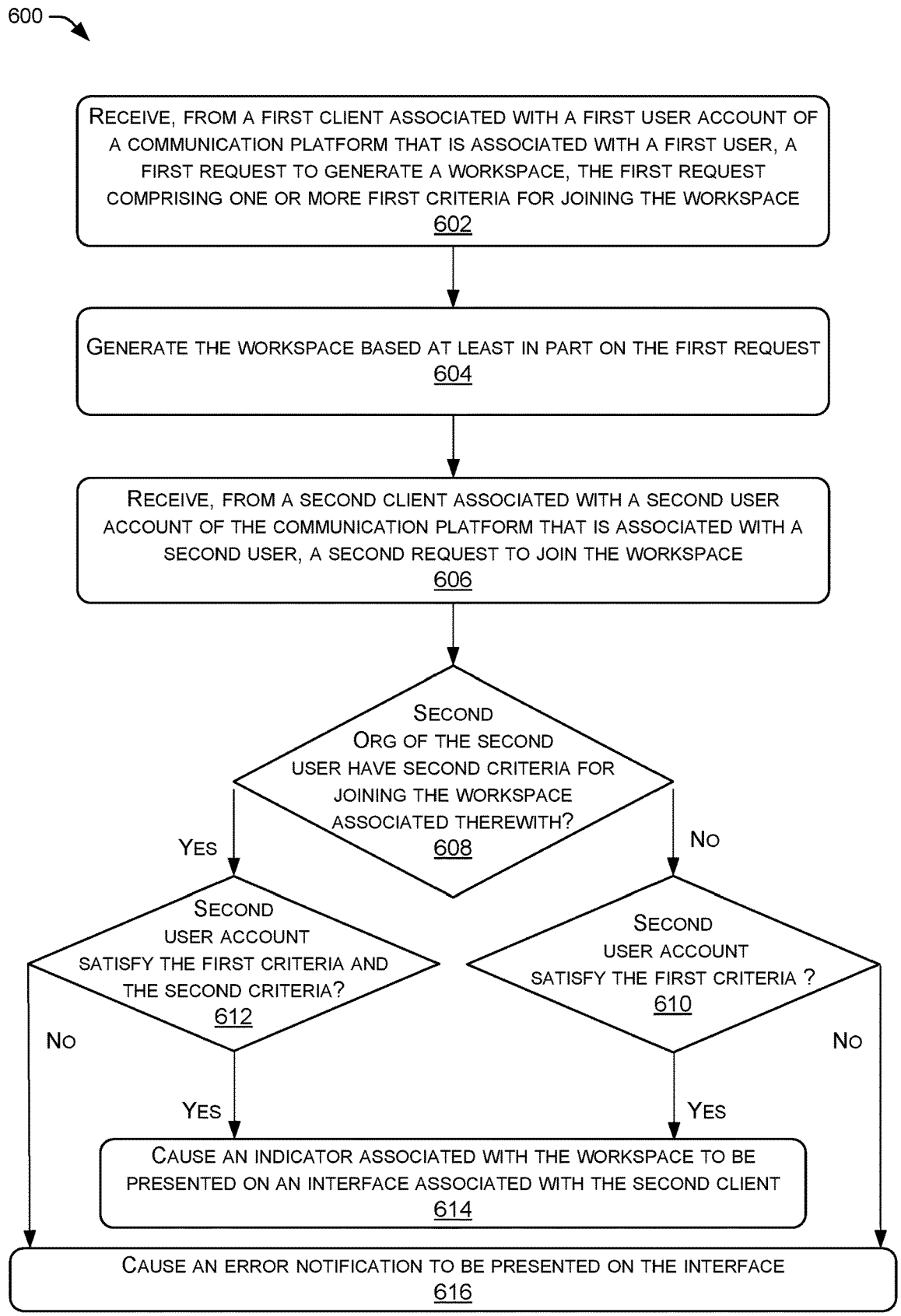
FIG. 6 illustrates an example process for creating and joining an integrated workspace, utilizing techniques described herein.

FIG. 6 illustrates an example process 600 for creating and joining an integrated workspace. In various examples, example process 600 may be carried out by communication platform server(s) 102, although in some examples user computing device(s) 104 may provide or receive at least some of the data and instructions discussed and/or may perform one or more of the operations instances where the processing is partially or completely distributed to user computing devices.

At operation 602, the communication platform receives, from a first client associated with a first user account of a communication platform that is associated with a first user, a first request to generate a workspace, the first request comprising one or more first criteria for joining the workspace. In at least one example, the workspace can include a shared or integrated workspace including two or more users associated with two or more organizations, groups, teams, or the like. The first criteria can include an indication of one or more organizations and/or groups to be associated with the shared workspace, one or more user characteristics (e.g., group or team affiliation (e.g., associated organizational identifier, group identifier, team identifier), project affiliation, job title, job description, personal interest, physical location, event affiliation (e.g., registration, purchased tickets, located at an event location, etc.), a portion of contact information (e.g., domain name associated with email address, area code associated with phone number, etc.), and the like. In various examples, the first user can designate, in the first request, one or more communication channels to be accessible to members of the shared workspace (e.g., users associated with the shared workspace).

At operation 604, the communication platform generates the workspace based at least in part on the first request. In various examples, the communication platform can cause an indicator associated with the workspace on an interface associated with the first client, such as a shared workspace interface (e.g., shared workspace interface 160, 302, etc.). In some examples, the indicator associated with the workspace can be presented in association with a shared workspace indicator, such as shared workspace indicator 310. In some examples, the indicator associated with the workspace, such as indicator 520, can be presented with one or more other workspace indicators.

At operation 606, the communication platform receives, from a second client associated with a second user account of the communication platform that is associated with a second user, a second request to join the workspace. In some examples, the communication platform receives the second request via an instance of a shared workspace interface or other interface of the communication platform. In some examples, the communication platform can automatically receive the second request from the second user account based on a determination, by an instance of a communication application associated therewith, that the second client is within a threshold distance of a location associated with the shared workspace. The instance of the communication application can determine the location based on location data associated with the second client, such as that received from one or more location components associated therewith. For example, the second user can register for an event that is associated with a shared workspace. The second user can store registration information in association with the second user account, via a communication application. The communication application can monitor a location associated with the second client and determine that the second client is within a threshold distance of the location associated with the event. Based on the location being within the threshold distance, the communication application can send the second request to the communication platform, to enable the second user access to the workspace. For another example, the location associated with the event may include an emitter (e.g., Bluetooth or other Near-field communication emitter) configured to communicate with the second client. The second client can receive the signal and determine that the location of the second client is within the threshold distance and/or is proximate the location associated with the event. Based on a determination of proximity (e.g., within the threshold distance), the second client can send the second request to the communication platform, to enable the second user access to the workspace.

At operation 608, the communication platform determines whether the second organization of the second user has second criteria for joining the workspace associated therewith. As discussed above, an administrator (e.g., administrative account) associated with the organization of the second user can associated one or more second criteria with the workspace. The second criteria can include additional criteria to be satisfied by users of the organization of the second user in order to join the workspace. In various examples, the second criteria can include additional or alternative criteria as the first criteria. For example, the first criteria can include an indication that users of the organization of the second user are eligible to join the workspace and the second criteria can limit eligibility to a subset of the users of the organization.

Based on a determination that the second criteria are not stored in association with the workspace ("No" at operation 608), the communication platform, at operation 610, determines whether the second user account satisfies the first criteria. As discussed above, in some examples, the communication platform accesses user data and/or characteristics of the second user to determine whether the second user account satisfies the first criteria. In some examples, the communication platform accesses location data associated with the second client to determine whether the second user account satisfies the first criteria. In some examples, the communication platform access third-party data, such as third party data 134, to determine whether the second user account satisfies the first criteria.

Based on a determination that the second criteria are stored in association with the workspace ("Yes" at operation 608), the communication platform, at operation 612, determines whether the second user account satisfies the first criteria and the second criteria. The communication platform can utilize techniques such as those described above, to determine whether the second user account additionally satisfies the second criteria.

Based on a determination that the first criteria and/or the second criteria are satisfied ("Yes" at operation 610 and/or operation 612), the communication platform, at operation 614, causes an indicator associated with the workspace, such as indicator 520, to be presented on an interface associated with the second client. In various examples, the indicator can include a selectable control to enable the second user access to the channel(s) associated with the shared workspace and/or information about the members of the workspace. In some examples, the indicator can additionally enable the second user access to one or more direct messaging instances associated with the shared workspace.

Based on a determination that the first criteria and/or the second criteria are not satisfied ("No" at operation 610 and/or operation 612), the communication platform, at operation 616, causes an error notification to be presented on the interface. In various examples, the error notification can include an indication that an association of the second user account with the workspace was declined and/or that the second user account does not satisfy the first criteria and/or the second criteria. In some examples, the error notification can provide an indication of the particular criteria that are not satisfied, such as to provide the second user with information necessary to update the second user account in order to satisfy the particular criteria and submit another request the join the workspace.

Figure 7:
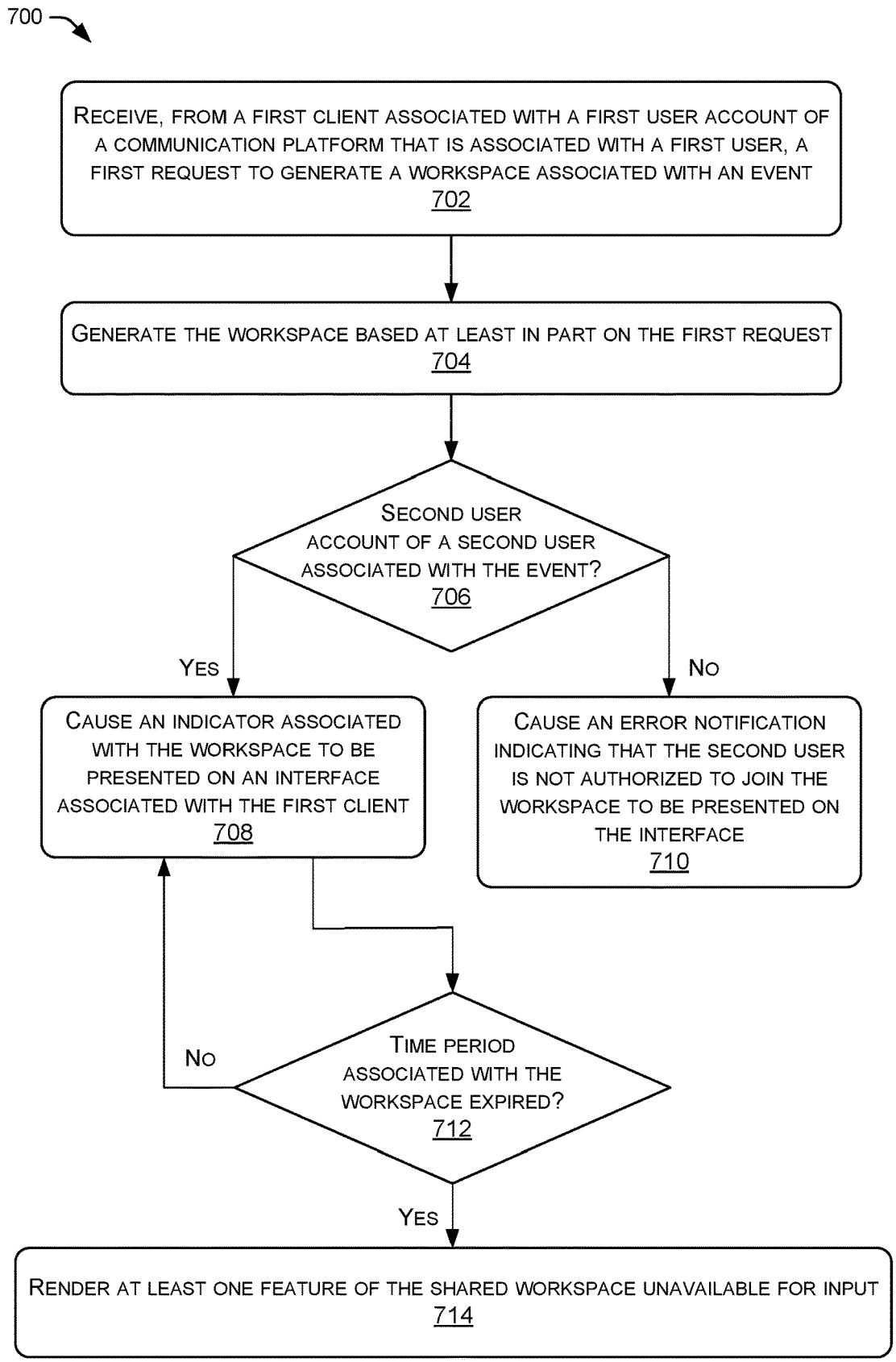
FIG. 7 illustrates an example process for creating and joining a workspace associated with an event, utilizing techniques described herein.

FIG. 7 illustrates an example process 700 for creating and joining a workspace associated with an event. In various examples, example process 700 may be carried out by communication platform server(s) 102, although in some examples user computing device(s) 104 may provide or receive at least some of the data and instructions discussed and/or may perform one or more of the operations instances where the processing is partially or completely distributed to user computing devices.

At operation 702, the communication platform receives, from a first client associated with a first user account of a communication platform that is associated with a first user, a first request to generate a workspace associated with an event (e.g., conference, ceremony, presentation, concert, etc.). In at least one example, the workspace can include a shared or integrated workspace including two or more users associated with two or more organizations, groups, teams, or the like. In various examples, the first request can include first criteria associated with joining the workspace. In at least one examples, the first criteria can include an event affiliation, such as a registration, purchased tickets, location identification at an event (e.g., based on location data associated with a user computing device, etc.), or the like. In some examples, the communication platform can be configured identify one or more users and/or user accounts that are affiliated with an event, such as based on registration information. In some examples, the communication can identify the one or more users and/or user accounts affiliated with the event based on third-party data received from a third party, such as an event registration service provider, or the like.

In some examples, the first criteria can additionally include an indication of one or more organizations and/or groups to be associated with the shared workspace, one or more user characteristics (e.g., group or team affiliation (e.g., associated organizational identifier, group identifier, team identifier), project affiliation, job title, job description, personal interest, physical location, a portion of contact information (e.g., domain name associated with email address, area code associated with phone number, etc.), and the like. In at least one example, the first criteria can include the event affiliation, such as a registration for the event, a determination that a user is at a location associated with the event, or the like.

Additionally or in the alternative, the request can include a request to generate a workspace associated with a particular project, deal, and/or other collaborative undertaking.

At operation 704, the communication platform generates the workspace based at least in part on the first request. In various examples, the communication platform can cause an indicator associated with the workspace on an interface associated with the first client, such as a shared workspace interface (e.g., shared workspace interface 160, 302, etc.). In some examples, the indicator associated with the workspace can be presented in association with a shared workspace indicator, such as shared workspace indicator 310. In some examples, the indicator associated with the workspace, such as indicator 520, can be presented with one or more other workspace indicators.

At operation 706, the communication platform determines whether a second user account of a second user of the communication platform is associated with the event. In some examples, the communication platform determines that the second user account is associated with the event based on third-party data (e.g., third-party data 134) received from a third-party service provider (e.g., third-party service provider 108) configured to manage event registration. In some examples, the communication platform can be configured to request the third-party data, such as to identify one or more user accounts associated with the event. In some examples, the third-party service provider can be configured to send the third-party data responsive to determining that a registration associated with a user is confirmed. In such examples, the third-party service provider can send the third-party data based on an instruction to provide the data to the communication platform.

In some examples, the second user account can be associated with the event based at least in part on an invitation to the event and/or an invitation to participate in the workspace, as provided by another member of the workspace (e.g., the first user). That is, in some examples, one or more members of the workspace and/or users who are associated with the event can invite another user to the event and/or to the workspace. For example, the first user can send an invitation to the second user inviting the second user to the event and/or to the workspace. Based on the invitation, the communication platform can associate the second user account with the event and/or the workspace. In various examples, a member of the workspace can invite another user to join the event and/or the workspace based on permissions associated with the workspace and/or the member account. In some examples, the permissions can be determined by an originator of the workspace and/or event (e.g., the first user) and/or an administrator associated with the workspace (e.g., administrative account associated with an organization of the first user).

Based on a determination that the second user account is associated with the event ("Yes" at operation 706), the communication platform, at operation 708, causes an indicator associated with the workspace, such as indicator 520, to be presented on an interface associated with the second client. In various examples, the indicator can include a selectable control to enable the second user access to the channel(s) associated with the shared workspace and/or information about the members of the workspace. In some examples, the indicator can additionally enable the second user access to one or more direct messaging instances associated with the shared workspace. In various examples, the indicator can be presented via the interface in association with an invitation to join the workspace. For example, the communication platform can identify one or more users and/or user accounts that are registered for the event and can automatically (e.g., without additional user input from the first user) send an invitation to join the workspace to the registered users and/or user accounts.

Based on a determination that the second user account is not associated with the event ("No" at operation 706), the communication platform, at operation 710, causes an error notification indicating that the second user is not authorized to join the workspace to be presented on the interface. In various examples, the error notification can include an indication that an association of the second user account with the workspace was declined and/or that the second user account is not associated with the event. In some examples, the error notification can provide a means by which the user can submit registration confirmation (e.g., confirmation number, attendee number, etc.) and/or a link to register for the event, such as via the third-party service provider, or the like. In various examples, in response to receiving an indication that the second user has registered for the event (e.g., from the third-party service provider, based on an input from the second user, etc.), the communication platform can associate the second user account with the shared workspace and/or cause the indicator associated with the workspace to be presented on the interface, such as described above with respect to operation 708.

At operation 712, the communication platform determines whether a time period associated with the workspace has expired. In some examples, the workspace may include a perpetual time (e.g., no expiration date and/or time). In such examples, the workspace may not expire and may continue to enable communications between users in perpetuity. In some examples, the workspace may have a finite time period associated therewith. In some examples, the finite time period can include a time associated with the event and/or an additional buffer time to enable communications for a period of time after the event concludes. For example, the workspace can be generated in association with a conference, enabling attendees of the conference to access information about one or more presentations of the conference via one or more communication channels. The creator and/or administrator associated with the workspace can determine that the time period associated with event should include the dates of the event plus a one week extension to enable the attendees to share additional information after the event.

Based on a determination that the time period has not expired ("No" at operation 712), the communication platform, continues to cause the indicator associated with the workspace to be presented on the interface, such as that described at operation 708. Based on a determination that the time period has expired ("Yes" at operation 712), the communication platform, at operation 714, renders at least one feature of the shared workspace associated with the workspace unavailable for input. The feature can include a communication channel, direct messaging instance, a board, a story, or the like. In some examples, the communication platform can mute the at least one feature. In some examples, the communication platform can mute (or otherwise render unavailable for input) each of the communication channels, direct messaging instances, boards, stories, and the like associated with the workspace. In some examples, the communication platform can mute a portion of the features and migrate or associate data corresponding to other features to a connect interface associated with a connect virtual space. For example, the communication platform can mute communication channels, boards and stories, and can migrate data associated with direct messaging instance(s) to a connect virtual space, such as to enable users of the workspace to continue private conversations established via the direct messaging instance(s).

In at least one example, the communication platform can cause the at least one feature and/or the workspace associated therewith to be archived in a datastore 126. In such examples, the members of the workspace can access data associated with the at least one feature and/or the workspace. In some examples, an archived feature(s) and/or workspace may be unavailable for input, such that the members can no longer transmit messages therein. In at least one example, the direct messaging instances generated in association with the workspace (e.g., via a member profile viewed via a directory, a selection of another user via an interface, or the like) can remain available for communications, regardless of the status of the workspace and/or at least one feature associated therewith (e.g., archived or not archived).

Figure 8:
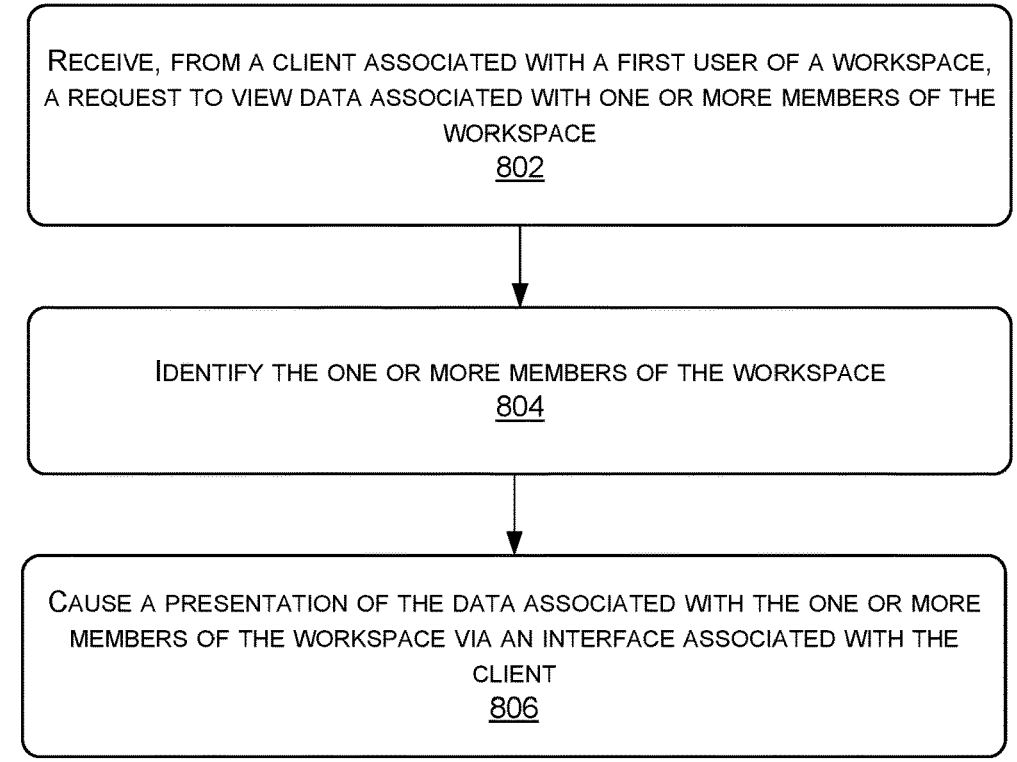
FIG. 8 illustrates an example process for providing information associated with members of an integrated workspace, utilizing techniques described herein.

FIG. 8 illustrates an example process 800 for providing information associated with members of an integrated workspace. In various examples, example process 800 can be carried out by communication platform server(s) 102, although in some examples user computing device(s) 104 may provide or receive at least some of the data and instructions discussed and/or may perform one or more of the operations instances where the processing is partially or completely distributed to user computing devices.

At operation 802, the communication platform receives, from a client associated with a first user of a workspace, a request to view data associated with one or more members of the workspace. In some examples, the request can be received in response to an indication of selection of a directory selectable control, such as directory selectable control 526.

At operation 804, the communication platform identifies the one or more members of the workspace. In some examples, the communication platform identifies the member(s) based on user identifiers associated with the workspace and/or a workspace identifier associated with user account(s) of the member(s). In at least one example, the member(s) can be associated with two or more different organizations. In some examples, at least one member can be associated with an organization and other members can be associated with other organizations and/or have no affiliation with an organization (e.g., individual account of the user, personal account of the user). In some examples, all of the members can be unaffiliated with organizations, such that the members each are associated with individual or personal accounts.

At operation 806, the communication platform causes a presentation of the data associated with the one or more members of the workspace via an interface associated with the client. In various examples, the data can include a portion of user data associated with the member(s). In some examples, the portion of the user data can include contact information (e.g., a name (e.g., real name, username, handle, etc.), email address, physical location (e.g., address, time zone, etc.), telephone number, etc.) associated with the members. In some examples, the data can include a selectable control to enable the first user to contact a second user (e.g., another workspace member) via a direct messaging instance.

EXAMPLE CLAUSES

A: A method implemented at least in part by one or more computing devices of a communication platform, the method comprising: receiving, from a first client associated with a first user account that is associated with a first organization of the communication platform, a first request to generate a workspace to facilitate communications between a first group of users associated with the first organization and a second group of users associated with at least a second organization that is different from the first organization, wherein the first request comprises one or more first criteria for joining the workspace; generating the workspace based at least in part on the first request, wherein the workspace comprises one or more virtual spaces, at least a portion of the one or more virtual spaces being restricted from view by other users not associated with the workspace; receiving, from a second client associated with a second user account that is associated with the second organization, a second request to join the workspace; based at least in part on a determination that the second user account satisfies the one or more first criteria associated with joining the workspace, associating the second user account with the workspace; and causing an indicator associated with the workspace to be presented in an interface associated with the second client, wherein the indicator enables access to the one or more virtual spaces associated with the workspace associated with the first group of users and the second group of users.

B: The method of paragraph A, further comprising: based at least in part on a determination that the second user account satisfies the one or more first criteria, causing a recommendation to join the workspace to be presented via the interface associated with the second client, the recommendation comprising a selectable option to join the workspace, wherein the second request is received in response to a selection of the selectable option to join the workspace.

C: The method of either paragraph A or paragraph B, further comprising: prior to receiving the second request: receiving, from an administrative user account associated with the second organization, one or more second criteria for a user account associated with the second organization to join the workspace; and based at least in part on a determination that the second user account satisfies the one or more second criteria associated with joining the workspace, causing a recommendation to join the workspace to be presented in the interface associated with the second client, the recommendation comprising a selectable option to join the workspace, wherein the second request is received in response to a selection of the selectable option to join the workspace.

D: The method of any one of paragraphs A-C, wherein the one or more first criteria and one or more second criteria comprise at least one of: an organization identifier; a group identifier; a domain name associated with a user account of a user; a user interest of the user; a job title associated with the user; a job description associated with the user; a project associated with the user; an event registration associated with the user; or a location associated with the user.

E: The method of any one of paragraphs A-D, wherein the second group of users comprises a plurality of users associated with a plurality of organizations.

F: The method of any one of paragraphs A-E, wherein the first request comprises one or more communication channels to associate with the workspace.

G: The method of any one of paragraphs A-F, wherein: the workspace further comprises contact information associated with the first group of users and the second group of users, the indicator further enables the second user account access to the contact information associated with the first group of users and the second group of users, and the contact information enables a second user associated with the second user account to communicate directly with a third user associated with the first organization.

H: A system associated with a communication platform, wherein the system comprises: one or more processors; and one or more computer-readable media comprising instructions that, when executed by the one or more processors, cause the system to perform operations comprising: receiving, from a first client associated with a first user account that is associated with a first organization of the communication platform, a first request to generate a workspace to facilitate communications between a first group of users associated with the first organization and a second group of users associated with at least a second organization that is different from the first organization, wherein the first request comprises one or more first criteria for joining the workspace; generating the workspace based at least in part on the first request, wherein the workspace comprises one or more virtual spaces, at least a portion of the one or more virtual spaces being restricted from view by other users not associated with the workspace; receiving, from a second client associated with a second user account that is associated with the second organization, a second request to join the workspace; based at least in part on a determination that the second user account satisfies the one or more first criteria associated with joining the workspace, associating the second user account with the workspace; and causing an indicator associated with the workspace to be presented in an interface associated with the second client, wherein the indicator enables access to the one or more virtual spaces associated with the workspace associated with the first group of users and the second group of users.

I: The system of paragraph H, the operations further comprising: based at least in part on a determination that the second user account satisfies the one or more first criteria, causing a recommendation to join the workspace to be presented via the interface associated with the second client, the recommendation comprising a selectable option to join the workspace, wherein the second request is received in response to a selection of the selectable option to join the workspace.

J: The system of either paragraph H or paragraph I, the operations further comprising: prior to receiving the second request: receiving, from an administrative user account associated with the second organization, one or more second criteria for a user account associated with the second organization to join the workspace; and based at least in part on a determination that the second user account satisfies the one or more second criteria associated with joining the workspace, causing a recommendation to join the workspace to be presented in the interface associated with the second client, the recommendation comprising a selectable option to join the workspace, wherein the second request is received in response to a selection of the selectable option to join the workspace.

K: The system of any one of paragraphs H-J wherein the one or more first criteria and one or more second criteria comprise at least one of: an organization identifier; a group identifier; a domain name associated with a user account of a user; a user interest of the user; a job title associated with the user; a job description associated with the user; a project associated with the user; an event registration associated with the user; or a location associated with the user.

L: The system of any one of paragraphs H-K, wherein the second group of users comprises a plurality of users associated with a plurality of organizations.

M: The system of any one of paragraphs H-L, wherein the first request comprises one or more communication channels to associate with the workspace.

N: The system of any one of paragraphs H-M, wherein: the workspace further comprises contact information associated with the first group of users and the second group of users, the indicator further enables the second user account access to the contact information associated with the first group of users and the second group of users, and the contact information enables a second user associated with the second user account to communicate directly with a third user associated with the first organization.

O: One or more non-transitory computer-readable media comprising instructions that, when executed by one or more processors, cause the one or more processors to perform operations comprising: receiving, from a first client associated with a first user account that is associated with a first organization of a communication platform, a first request to generate a workspace to facilitate communications between a first group of users associated with the first organization and a second group of users associated with at least a second organization that is different from the first organization, wherein the first request comprises one or more first criteria for joining the workspace; generating the workspace based at least in part on the first request, wherein the workspace comprises one or more virtual spaces, at least a portion of the one or more virtual spaces being restricted from view by other users not associated with the workspace; receiving, from a second client associated with a second user account that is associated with the second organization, a second request to join the workspace; based at least in part on a determination that the second user account satisfies the one or more first criteria associated with joining the workspace, associating the second user account with the workspace; and causing an indicator associated with the workspace to be presented in an interface associated with the second client, wherein the indicator enables access to the one or more virtual spaces associated with the workspace associated with the first group of users and the second group of users.

P: The one or more non-transitory computer-readable media of paragraph O, the operations further comprising: based at least in part on a determination that the second user account satisfies the one or more first criteria, causing a recommendation to join the workspace to be presented via the interface associated with the second client, the recommendation comprising a selectable option to join the workspace, wherein the second request is received in response to a selection of the selectable option to join the workspace.

Q: The one or more non-transitory computer-readable media of either paragraph O or paragraph P, the operations further comprising: prior to receiving the second request: receiving, from an administrative user account associated with the second organization, one or more second criteria for a user account associated with the second organization to join the workspace; and based at least in part on a determination that the second user account satisfies the one or more second criteria associated with joining the workspace, causing a recommendation to join the workspace to be presented in the interface associated with the second client, the recommendation comprising a selectable option to join the workspace, wherein the second request is received in response to a selection of the selectable option to join the workspace.

R: The one or more non-transitory computer-readable media of any one of paragraphs O-Q, wherein the one or more first criteria and one or more second criteria comprise at least one of: an organization identifier; a group identifier; a domain name associated with a user account of a user; a user interest of the user; a job title associated with the user; a job description associated with the user; a project associated with the user; an event registration associated with the user; or a location associated with the user.

S: The one or more non-transitory computer-readable media of any one of paragraphs O-R, wherein the second group of users comprises a plurality of users associated with a plurality of organizations.

T: The one or more non-transitory computer-readable media of any one of paragraphs O-S, wherein the first request comprises one or more communication channels to associate with the workspace.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A method implemented at least in part by one or more computing devices of a communication platform, the method comprising:
    receiving, from a first client associated with a first user account that is associated with a first organization of the communication platform, a first request to generate a workspace to facilitate communications between a first group of users associated with the first organization and a second group of users associated with at least a second organization that is different from the first organization,
    wherein the first request comprises one or more first criteria for joining the workspace;
    generating the workspace based at least in part on the first request,
    wherein the workspace comprises one or more virtual spaces, at least a portion of the one or more virtual spaces being restricted from view by other users not associated with the workspace;

receiving, from a second client associated with a second user account that is associated with the second organization, a second request to join the workspace;

based at least in part on a determination that the second user account satisfies the one or more first criteria associated with joining the workspace, associating the second user account with the workspace; and causing an indicator associated with the workspace to be presented in an interface associated with the second client, wherein the indicator enables access to the one or more virtual spaces associated with the workspace associated with the first group of users and the second group of users.

2. The method of claim 1, further comprising:

based at least in part on the determination that the second user account satisfies the one or more first criteria, causing a recommendation to join the workspace to be presented via the interface associated with the second client, the recommendation comprising a selectable option to join the workspace, wherein the second request is received in response to a selection of the selectable option to join the workspace.

3. The method of claim 1, further comprising:

prior to receiving the second request:

receiving, from an administrative user account associated with the second organization, one or more second criteria for the second user account associated with the second organization to join the workspace; and based at least in part on the determination that the second user account satisfies the one or more second criteria associated with joining the workspace, causing a recommendation to join the workspace to be presented in the interface associated with the second client, the recommendation comprising a selectable option to join the workspace, wherein the second request is received in response to a selection of the selectable option to join the workspace.

4. The method of claim 1, wherein the one or more first criteria and one or more second criteria comprise at least one of:

an organization identifier;
a group identifier;
a domain name associated with a user account of a user;
a user interest of the user;
a job title associated with the user;
a job description associated with the user;
a project associated with the user;
an event registration associated with the user; or
a location associated with the user.

5. The method of claim 1, wherein the second group of users comprises a plurality of users associated with a plurality of organizations.

6. The method of claim 1, wherein the first request comprises one or more communication channels to associate with the workspace.

7. The method of claim 1, wherein:

the workspace further comprises contact information associated with the first group of users and the second group of users, the indicator further enables the second user account access to the contact information associated with the first group of users and the second group of users, and the contact information enables a second user associated with the second user account to communicate directly with a third user associated with the first organization.

8. A system associated with a communication platform, wherein the system comprises:

one or more processors; and one or more computer-readable media comprising instructions that, when executed by the one or more processors, cause the system to perform operations comprising:

receiving, from a first client associated with a first user account that is associated with a first organization of the communication platform, a first request to generate a workspace to facilitate communications between a first group of users associated with the first organization and a second group of users associated with at least a second organization that is different from the first organization, wherein the first request comprises one or more first criteria for joining the workspace;

generating the workspace based at least in part on the first request, wherein the workspace comprises one or more virtual spaces, at least a portion of the one or more virtual spaces being restricted from view by other users not associated with the workspace;

receiving, from a second client associated with a second user account that is associated with the second organization, a second request to join the workspace;

based at least in part on a determination that the second user account satisfies the one or more first criteria associated with joining the workspace, associating the second user account with the workspace; and causing an indicator associated with the workspace to be presented in an interface associated with the second client, wherein the indicator enables access to the one or more virtual spaces associated with the workspace associated with the first group of users and the second group of users.

9. The system of claim 8, the operations further comprising:

based at least in part on the determination that the second user account satisfies the one or more first criteria, causing a recommendation to join the workspace to be presented via the interface associated with the second client, the recommendation comprising a selectable option to join the workspace, wherein the second request is received in response to a selection of the selectable option to join the workspace.

10. The system of claim 8, the operations further comprising:

prior to receiving the second request:

receiving, from an administrative user account associated with the second organization, one or more second criteria for the second user account associated with the second organization to join the workspace; and based at least in part on the determination that the second user account satisfies the one or more second criteria associated with joining the workspace, causing a recommendation to join the workspace to be presented in the interface associated with the second client, the recommendation comprising a selectable option to join the workspace, wherein the second request is received in response to a selection of the selectable option to join the workspace.

11. The system of claim 8, wherein the one or more first criteria and one or more second criteria comprise at least one of:
   an organization identifier;
   a group identifier;
   a domain name associated with a user account of a user;
   a user interest of the user;
   a job title associated with the user;
   a job description associated with the user;
   a project associated with the user;
   an event registration associated with the user; or
   a location associated with the user.

12. The system of claim 8, wherein the second group of users comprises a plurality of users associated with a plurality of organizations.

13. The system of claim 8, wherein the first request comprises one or more communication channels to associate with the workspace.

14. The system of claim 8, wherein:
   the workspace further comprises contact information associated with the first group of users and the second group of users,
   the indicator further enables the second user account access to the contact information associated with the first group of users and the second group of users, and the contact information enables a second user associated with the second user account to communicate directly with a third user associated with the first organization.

15. One or more non-transitory computer-readable media comprising instructions that, when executed by one or more processors, cause the one or more processors to perform operations comprising:
   receiving, from a first client associated with a first user account that is associated with a first organization of a communication platform, a first request to generate a workspace to facilitate communications between a first group of users associated with the first organization and a second group of users associated with at least a second organization that is different from the first organization, wherein the first request comprises one or more first criteria for joining the workspace;
   generating the workspace based at least in part on the first request,
   wherein the workspace comprises one or more virtual spaces, at least a portion of the one or more virtual spaces being restricted from view by other users not associated with the workspace;
   receiving, from a second client associated with a second user account that is associated with the second organization, a second request to join the workspace;
   based at least in part on a determination that the second user account satisfies the one or more first criteria associated with joining the workspace, associating the second user account with the workspace; and
   causing an indicator associated with the workspace to be presented in an interface associated with the second client,
   wherein the indicator enables access to the one or more virtual spaces associated with the workspace associated with the first group of users and the second group of users.

16. The one or more non-transitory computer-readable media of claim 15, the operations further comprising:
   based at least in part on the determination that the second user account satisfies the one or more first criteria, causing a recommendation to join the workspace to be presented via the interface associated with the second client, the recommendation comprising a selectable option to join the workspace,
   wherein the second request is received in response to a selection of the selectable option to join the workspace.

17. The one or more non-transitory computer-readable media of claim 15, the operations further comprising:
   prior to receiving the second request:
      receiving, from an administrative user account associated with the second organization, one or more second criteria for the second user account associated with the second organization to join the workspace; and
      based at least in part on the determination that the second user account satisfies the one or more second criteria associated with joining the workspace, causing a recommendation to join the workspace to be presented in the interface associated with the second client, the recommendation comprising a selectable option to join the workspace,
      wherein the second request is received in response to a selection of the selectable option to join the workspace.

18. The one or more non-transitory computer-readable media of claim 15, wherein the one or more first criteria and one or more second criteria comprise at least one of:
   an organization identifier;
   a group identifier;
   a domain name associated with a user account of a user;
   a user interest of the user;
   a job title associated with the user;
   a job description associated with the user;
   a project associated with the user;
   an event registration associated with the user; or
   a location associated with the user.

19. The one or more non-transitory computer-readable media of claim 15, wherein the second group of users comprises a plurality of users associated with a plurality of organizations.

20. The one or more non-transitory computer-readable media of claim 15, wherein the first request comprises one or more communication channels to associate with the workspace.

* * * * *